(12) United States Patent
Huang et al.

(10) Patent No.: US 12,460,833 B2
(45) Date of Patent: Nov. 4, 2025

(54) ENERGY CONTROL SYSTEM, METHOD AND DEVICE, AND ELECTRONIC EQUIPMENT

(71) Applicant: Gree Electric Appliances, Inc. of Zhuhai, Guangdong (CN)

(72) Inventors: Meng Huang, Guangdong (CN); Yingyi Jiang, Guangdong (CN); Xiaogao Liu, Guangdong (CN); Songru Huang, Guangdong (CN); Peiyu Dang, Guangdong (CN)

(73) Assignee: Gree Electric Appliances, Inc. of Zhuhai, Guangdong (CN)

( * ) Notice: Subject to any disclaimer, the term of this patent is extended or adjusted under 35 U.S.C. 154(b) by 484 days.

(21) Appl. No.: 18/012,420

(22) PCT Filed: Aug. 2, 2021

(86) PCT No.: PCT/CN2021/110074
§ 371 (c)(1),
(2) Date: Dec. 22, 2022

(87) PCT Pub. No.: WO2022/028368
PCT Pub. Date: Feb. 10, 2022

(65) Prior Publication Data
US 2023/0243538 A1  Aug. 3, 2023

(30) Foreign Application Priority Data
Aug. 3, 2020  (CN) .................. 202010769269.1

(51) Int. Cl.
*F24F 11/46* (2018.01)
*F24F 11/65* (2018.01)
(Continued)

(52) U.S. Cl.
CPC .............. *F24F 11/46* (2018.01); *F24F 11/65* (2018.01); *G05B 19/042* (2013.01); *H02J 1/106* (2020.01);
(Continued)

(58) Field of Classification Search
CPC .. F24F 11/46; F24F 11/61; F24F 11/64; F24F 11/65; F24F 11/85; F24F 11/86;
(Continued)

(56) References Cited

U.S. PATENT DOCUMENTS

| 2012/0093141 A1 | 4/2012 | Imes et al. |
| 2012/0161525 A1* | 6/2012 | Hong ............... H02J 3/381 307/73 |
| 2015/0198349 A1* | 7/2015 | Numazaki ........... F24F 11/88 165/212 |

FOREIGN PATENT DOCUMENTS

| CN | 102361328 A | 2/2012 |
| CN | 104596002 A | 5/2015 |

(Continued)

*Primary Examiner* — Tameem D Siddiquee
(74) *Attorney, Agent, or Firm* — The Webb Law Firm

(57) ABSTRACT

Disclosed in the present disclosure are an energy control system, method and device, and electronic equipment. The energy control system includes a controlled system, an energy control device and a weather server. The controlled system includes power generation equipment, energy storage equipment and air conditioning equipment. The power generation equipment, the energy storage equipment and the air conditioning equipment are connected in parallel by means of a direct-current bus. The air conditioning equipment is also connected to an alternating-current power grid; and the energy control device is in communication connection with the controlled system and the weather server respectively, and is used to acquire weather forecast information in a preset future time period from the weather server
(Continued)

and send an optimal energy flow configuration in the preset future time period to the controlled system.

18 Claims, 4 Drawing Sheets

(51) Int. Cl.
  *F24F 130/10* (2018.01)
  *F28D 20/00* (2006.01)
  *G05B 19/042* (2006.01)
  *H02J 1/10* (2006.01)
  *H02J 1/14* (2006.01)
(52) U.S. Cl.
  CPC ............. *H02J 1/14* (2013.01); *F24F 2130/10* (2018.01); *F28D 20/00* (2013.01); *G05B 2219/2614* (2013.01); *H02J 2300/26* (2020.01)
(58) Field of Classification Search
  CPC ...... F24F 11/88; F24F 2130/10; F24F 5/0046; F28D 20/00; G05B 19/042; G05B 2219/2614; H02J 1/106; H02J 1/14; H02J 2300/24; H02J 2300/26; H02J 2310/14; H02J 3/28; H02J 3/32; H02J 3/381; H02J 7/35

See application file for complete search history.

(56) References Cited

FOREIGN PATENT DOCUMENTS

| CN | 104913456 A | 9/2015 |
| CN | 105207267 A | 12/2015 |
| CN | 105846418 A | 8/2016 |
| CN | 107040034 A | 8/2017 |
| CN | 108649602 A | 10/2018 |
| CN | 108767866 | * 11/2018 |
| CN | 108767866 A | 11/2018 |
| CN | 110336331 A | 10/2019 |
| CN | 209896705 U | 1/2020 |
| CN | 210380274 U | 4/2020 |
| CN | 111981643 A | 11/2020 |
| JP | 2008043148 A | 2/2008 |
| JP | 2009225550 A | 10/2009 |
| JP | 2017121133 A | 7/2017 |
| WO | 2016101644 A | 6/2016 |

* cited by examiner

ENERGY CONTROL SYSTEM, METHOD AND DEVICE, AND ELECTRONIC EQUIPMENT

CROSS-REFERENCE TO RELATED APPLICATIONS

This application is a U.S. National Stage Application under 35 U.S.C. § 371 of International Patent Application No. PCT/CN2021/110074, filed on Aug. 2, 2021, which is based on and claims the priority to the Chinese patent application No. 202010769269.1 filed on Aug. 3, 2020, the disclosure of both of which are hereby incorporated in its entirety into the present application.

BACKGROUND OF THE INVENTION

Field of the Invention

This disclosure relates to the technical field of energy control, and in particular, to an energy control system, method and device, and an electronic equipment.

Description of Related Art

At present, for an integrated system of electricity generation, energy storage and energy consumption, for example, in a photovoltaic/energy storage/air conditioning integrated system, energy flowing control among utility power grid, energy storage, photovoltaic, and air conditioning compressors is to control energy flowing among the photovoltaic, the energy storage, and the utility power grid by synthesizing peak and valley electricity prices and energy consumption regularity of the air conditioning system. In daytime, main control is based on power balance of photovoltaic electricity generation power, stored energy, and utility power grid electricity supply power between the air conditioning compressors, and at night, the main control is based on power balance of the utility power grid electricity supply power between the air conditioning system and the stored energy, and for a priority of the energy flowing, benefit maximization between energy consumption of the air conditioning and the peak and valley electricity prices is passively considered, so that maximization of the comprehensive benefit of the system cannot be effectively ensured.

SUMMARY OF THE INVENTION

Embodiments of the present disclosure provide an energy control system, method and device, to at least solve the problem that the energy control in the related art cannot effectively ensure maximization of the comprehensive benefit of the system.

In order to solve the above technical problem, some embodiments of the present disclosure provides an energy control system, comprising: a controlled system, an energy control device, and a weather server; Wherein:
the controlled system comprises: a power generation equipment, an energy storage equipment, and an air conditioning equipment; the power generation equipment, the energy storage equipment, and the air conditioning equipment are connected in parallel through a direct-current bus; the air conditioning equipment is also connected to an alternating-current power grid;
the energy control device is in communication connection with the controlled system and the weather server respectively, the energy control device is configured to acquire weather forecast information in a preset future time period from the weather server and send an optimal energy flowing configuration in the preset future time period to the controlled system.

In some embodiments, the air conditioning equipment comprises: a converter and an air conditioning host; Wherein:
the converter comprises: a first alternating-current end, a second alternating-current end, and a direct-current end;
the first alternating-current end is connected to the alternating-current power grid, the second alternating-current end is connected to the air conditioning host, the direct-current end is connected to the direct-current bus.

In some embodiments, the converter comprises: an AC/DC module and a DC/AC module, wherein:
the AC/DC module comprises a first end and a second end, the DC/AC module comprises a third end and a fourth end;
the first end is used as the second alternating-current end of the converter;
the second end is connected to the third end, and a connection point of the second end and the third end is used as the direct-current end of the converter;
the fourth end is used as the first alternating-current end of the converter.

In some embodiments, the converter is in communication connection with the energy control device.

In some embodiments, the air conditioning host comprises: a compressor, a condenser, a throttling device, and an evaporator, wherein the compressor is connected to the second alternating-current end of the converter.

In some embodiments, the energy storage equipment comprises: an energy storage mechanism and a DC/DC transformer; wherein: one end of the DC/DC transformer is connected to the energy storage mechanism, and the other end of the DC/DC transformer is connected to the direct-current bus; the energy storage mechanism is also connected to the air conditioning equipment.

In some embodiments, the energy storage mechanism comprises: an electricity energy storage component and a cold energy storage component; or, the electricity energy storage component or the cold energy storage component; wherein:
the electricity energy storage component is connected to the DC/DC transformer;
the evaporator in the air conditioning host is connected to an air conditioning terminal through a chilled water inlet pipeline and a chilled water outlet pipeline, the chilled water inlet pipeline is thereon sequentially provided with a chilled water pump and a main water pump, the chilled water outlet pipeline is thereon sequentially provided with a first valve and a second valve, the chilled water pump and the first valve are close to the evaporator side;
the cold energy storage component is connected between the first valve and the second valve through a first pipeline, the cold energy storage component is also connected between the chilled water pump and the main water pump through a second pipeline, the second pipeline is thereon provided with a third valve.

In some embodiments, the DC/DC transformer is in communication connection with the energy control device.

In some embodiments, the energy control system further comprises: a communication module, connected between the energy control device and the weather server.

In some embodiments, the power generation equipment is a photovoltaic power generation equipment.

An embodiment of the present disclosure further provides an energy control method applied to the energy control system according to the embodiment of the present disclosure, the method comprising:

acquiring weather forecast information of an area where a controlled system is located in a preset future time period;

determining an optimal energy flowing configuration of the controlled system in the preset future time period, according to the weather forecast information and current energy storage information of the controlled system; and controlling the controlled system to run according to the optimal energy flowing configuration so that the controlled system is in an optimal running state with maximum benefit in the preset future time period.

In some embodiments, the determining an optimal energy flowing configuration of the controlled system in the preset future time period, according to the weather forecast information and current energy storage information of the controlled system comprises:

estimating electricity energy generated by a power generation equipment at each time moment in the preset future time period according to the weather forecast information;

estimating cold energy required by an air conditioning equipment at each time moment in the preset future time period according to a preset rule; and performing evolutionary operation on an objective function to obtain the optimal energy flowing configuration according to the generated electricity energy at each time moment, the required cold energy at each time moment, the current energy storage information, and an energy balance formula of the controlled system.

In some embodiments, the objective function is:

$$\min_{0-\tau}(t) = \min_{0-\tau} f(f_1(t), f_2(t)),$$

wherein
$$\begin{cases} f_1(t) = \int_0^\tau m(t)p(t)d(t) \\ f_2(t) = c(t) - h_M(t) \end{cases},$$

$\tau$ denotes a duration of the preset future time period, t denotes a time moment in the preset future time period, $f_1(t)$ denotes an electricity charge budget of the controlled system, m(t) denotes an electricity price of an alternating-current power grid, p(t) denotes electricity consumption power of the controlled system to the alternating-current power grid, $f_2(t)$ denotes a difference between required cold energy of the controlled system and actual supply cold energy, c(t) denotes refrigeration power required by an air conditioning terminal in the controlled system, $h_M(t)$ denotes actual refrigeration power of the air conditioning terminal in the controlled system.

In some embodiments, the energy balance formula is:

$$\begin{cases} 0 = c(t) - c_S(t) - c_M(t) \\ 0 = p(t) - p_M(t) + p_P(t) - p_{SP}(t) \\ 0 = c_M(t) - \eta p_M(t) \\ 0 = p_P(t) - h_P(t)T(t) \\ 0 = p_{A(n+1)}(t) - \int_0^\tau p_{SP}(t)d(t) - p_{A(n)}(t) \\ 0 = c_{A(n+1)}(t) - \int_0^\tau c_S(t)d(t) - c_{A(n)}(t) \end{cases},$$

wherein $\tau$ denotes a duration of the preset future time period, t denotes a time moment in the preset future time period, c(t) denotes refrigeration power required by an air conditioning terminal in the controlled system, $c_S(t)$ denotes cold energy storage power, $c_M(t)$ denotes refrigeration power of heat exchange of a compressor, p(t) denotes electricity consumption power of the controlled system to the alternating-current power grid, $p_M(t)$ denotes electricity consumption power of energy-consumption heat exchange of the compressor, $p_P(t)$ denotes actual electricity generation power, $p_{SP}(t)$ denotes electricity storage power, $\eta$ denotes heat exchange efficiency of the compressor, $h_P(t)$ denotes an efficiency function of electricity generation power corresponding to a weather condition, T(t) denotes a weather function, $p_{A(n)}(t)$ denotes current actual stored electricity energy of an energy storage equipment at an initial time moment of the operation, $p_{A(n+1)}(t)$ denotes real-time stored electricity energy in the preset future time period that is obtained by the operation, $c_{A(n)}(t)$ denotes current actual stored cold energy of the energy storage equipment at the initial time moment of the operation, and $c_{A(n+1)}(t)$ denotes real-time stored cold energy in the future preset time that is obtained by the operation.

In some embodiments, A limiting condition of the energy balance formula is:

$$\begin{cases} C_T \geq c(t) \\ C_S \geq c_S(t) \\ C_M \geq c_M(t) \\ P_T \geq p(t) \\ P_M \geq p_M(t) \\ p_M(t) \geq 0 \\ p_S(t) \geq 0 \\ P_{SP} \geq |p_{SP}(t)| \\ C \geq c_{An}(t) \\ P \geq p_{An}(t) \\ p_{An}(t) \geq 0 \\ c_{An}(t) \geq 0 \end{cases},$$

wherein $C_T$ denotes a maximum power limit of the refrigeration power required by the air conditioning terminal in the controlled system, $C_S$ denotes a maximum power limit of the cold energy storage power, $C_M$ denotes a maximum power limit of the refrigeration power of the heat exchange the compressor, $P_T$ denotes a maximum power limit of the electricity consumption power of the controlled system to the alternating-current power grid, $P_M$ denotes a maximum power limit of the electricity consumption power of the energy-consumption heat exchange of the compressor, $p_S(t)$ denotes estimated electricity generation power, $P_{SP}$ denotes a maximum power limit of the electricity storage power, C denotes maximum stored cold energy, and P denotes maximum stored electricity energy.

In some embodiments, the optimal energy flowing configuration comprises: in the preset future time period, the electricity consumption power of the controlled system to the alternating-current power grid at each time moment, the electricity consumption power of the energy-consumption heat exchange of the compressor at each time moment, the estimated electricity generation power at each time moment, the refrigeration power required by the air conditioning terminal at each time moment, the refrigeration power of the heat exchange of the compressor at each time moment, energy storage power at each time moment, and stored energy at each time moment, wherein the energy storage power at each time moment comprises: the electricity storage power at each time moment and/or the cold energy storage power at each time moment, the stored energy at each time moment comprises the stored electricity energy at each time moment and/or the stored cold energy at each time moment.

In some embodiments, the controlling the controlled system to run according to the optimal energy flowing configuration comprises at least one of:

controlling, through a converter in the air conditioning equipment, energy flowing between the alternating-current power grid and a direct-current bus according to the electricity consumption power of the controlled system to the alternating-current power grid in the optimal energy flowing configuration;

controlling, through the converter in the air conditioning equipment, energy flowing between the compressor and the direct-current bus according to the electricity consumption power of the energy-consumption heat exchange of the compressor in the optimal energy flowing configuration;

controlling energy flowing between the power generation equipment and the direct-current bus according to the estimated electricity generation power in the optimal energy flowing configuration;

controlling, through a DC/DC transformer in the energy storage equipment, energy flowing between an electricity energy storage component in the energy storage equipment and the direct-current bus according to the electricity storage power in the optimal energy flowing configuration;

controlling, through the converter in the air conditioning equipment, energy flowing among a cold energy storage component in the energy storage equipment, an evaporator in an air conditioning host, and the air conditioning terminal, according to the cold energy storage power, the refrigeration power required by the air conditioning terminal, and the refrigeration power of the heat exchange of the compressor in the optimal energy flowing configuration; or controlling heat exchange between the air conditioning terminal and an area environment where the air conditioning terminal is located according to the refrigeration power required by the air conditioning terminal in the optimal energy flowing configuration.

In some embodiments, the controlling, through a converter in the air conditioning equipment, energy flowing between the alternating-current power grid and a direct-current bus according to the electricity consumption power of the controlled system to the alternating-current power grid in the optimal energy flowing configuration comprises:

if the electricity consumption power of the controlled system to the alternating-current power grid is greater than 0, controlling a DC/AC module in the converter to start a controllable rectification mode, rectify alternating-current of the alternating-current power grid into direct-current, and control electric energy to flow from the alternating-current power grid to the direct-current bus;

if the electricity consumption power of the controlled system to the alternating-current power grid is less than 0, controlling the DC/AC module in the converter to start a controllable rectification mode, to invert direct-current of the direct-current bus into alternating-current and feed the alternating-current back to the alternating-current power grid; and if the electricity consumption power of the controlled system to the alternating-current power grid is equal to 0, controlling the DC/AC module in the converter to start a direct-current voltage stabilization mode, to stabilize voltage of the direct-current bus to MPPT voltage of the power generation equipment.

In some embodiments, the controlling, through the converter in the air conditioning equipment, energy flowing between the compressor and the direct-current bus according to the electricity consumption power of the energy-consumption heat exchange of the compressor in the optimal energy flowing configuration comprises:

if the electricity consumption power of the energy-consumption heat exchange of the compressor is greater than 0, controlling an AC/DC module in the converter to invert direct-current of the direct-current bus into alternating-current, and controlling electric energy to flow from the direct-current bus to the compressor; and if the electricity consumption power of the energy-consumption heat exchange of the compressor is equal to 0, controlling the AC/DC module in the converter to stop the inversion function, and controlling the compressor to stand by.

In some embodiments, the controlling energy flowing between the power generation equipment and the direct-current bus according to the estimated electricity generation power in the optimal energy flowing configuration comprises:

if the estimated electricity generation power is greater than 0, controlling the power generation equipment to be in a power generation mode, and controlling electric energy to flow from the power generation equipment to the direct-current bus; and if the estimated electricity generation power is equal to 0, controlling the power generation equipment to stop generating electricity and to be in an open-circuit state.

In some embodiments, the controlling, through a DC/DC transformer in the energy storage equipment, energy flowing between an electricity energy storage component in the energy storage equipment and the direct-current bus according to the electricity storage power in the optimal energy flowing configuration comprises:

if the electricity storage power is greater than 0, converting electric energy of the direct-current bus, through the DC/DC transformer in the energy storage equipment, to charge the electricity energy storage component;

if the electricity storage power is equal to 0, controlling the DC/DC transformer to be in a standby state, and controlling the electricity energy storage component to be in a standby energy storage state; and if the electricity storage power is less than 0, converting electricity energy taken from the electricity energy storage component through the DC/DC transformer, to be supplied to the direct-current bus.

In some embodiments, the controlling, through the converter in the air conditioning equipment, energy flowing among a cold energy storage component in the energy storage equipment, an evaporator in an air conditioning host, and the air conditioning terminal according to the cold energy storage power, the refrigeration power required by the air conditioning terminal, and the refrigeration power of the heat exchange of the compressor in the optimal energy flowing configuration comprises:

if the cold energy storage power is greater than 0, controlling a first valve, a third valve and a chilled water pump to be opened through the converter to perform cold energy storage on the cold energy storage component, and controlling chilled water to flow in a cold energy storage state of the cold energy storage component according to the refrigeration power required by the air conditioning terminal;

if the cold energy storage power is equal to 0, controlling the third valve to be closed through the converter, and controlling the chilled water to flow in a standby state of the cold energy storage component according to the refrigeration power required by the air conditioning terminal; and if the cold energy storage power is less than 0, controlling the third valve to be opened through the converter to enable the cold energy storage component to release cold energy, and controlling cold energy supply of the air conditioning terminal according to the refrigeration power of the heat exchange of the compressor, wherein the evaporator in the air conditioner host is connected to the air conditioning terminal through a chilled water inlet pipe and a chilled water outlet pipe, the chilled water inlet pipe is thereon sequentially provided with a chilled water pump and a main water pump, the chilled water outlet pipe is thereon sequentially provided with the first valve and a second valve, the chilled water pump and the first valve are close to the evaporator side; and the cold energy storage component is connected between the first valve and the second valve through a first pipeline, and the cold energy storage component is also connected between the chilled water pump and the main water pump through a second pipeline, the second pipeline is thereon provided with the third valve.

In some embodiments, the controlling chilled water to flow in a cold energy storage state of the cold energy storage component according to the refrigeration power required by the air conditioning terminal comprises:

if the refrigeration power required by the air conditioning terminal is equal to 0, outputting a first control signal through the converter, wherein the first control signal is used for controlling the second valve and the main water pump to be closed; and if the refrigeration power required by the air conditioning terminal is greater than 0, outputting a second control signal through the converter, wherein the second control signal is used for controlling the second valve and the main water pump to be opened, and controlling a flow of the main water pump to be less than a flow of the chilled water pump.

In some embodiments, the controlling the chilled water to flow in a standby state of the cold energy storage component according to the refrigeration power required by the air conditioning terminal comprises:

if the refrigeration power required by the air conditioning terminal is equal to 0, outputting a third control signal through the converter, wherein the third control signal is used for controlling the first valve, the second valve, the chilled water pump, and the main water pump to be all closed; and if the refrigeration power required by the air conditioning terminal is greater than 0, outputting a fourth control signal through the converter, wherein the fourth control signal is used for controlling the first valve, the second valve, the chilled water pump, and the main water pump to be all opened, and controlling the flow of the main water pump to be equal to the flow of the chilled water pump.

In some embodiments, the controlling cold energy supply of the air conditioning terminal according to the refrigeration power of the heat exchange of the compressor comprises:

if the refrigeration power of the heat exchange of the compressor is equal to 0, determining that required cold energy is supplied by the cold energy storage component to the air conditioning terminal, and outputting a fifth control signal through the converter, wherein the fifth control signal is used for controlling the first valve and the chilled water pump to be closed, and controlling the second valve and the main water pump to be opened; and if the refrigeration power of the heat exchange of the compressor is greater than 0, determining that the required cold energy is jointly supplied by the compressor and the cold energy storage component to the air conditioning terminal, and outputting a sixth control signal through the converter, wherein the sixth control signal is used for controlling the first valve, the second valve, the chilled water pump, and the main water pump to be all opened, and controlling the flow of the main water pump to be greater than the flow of the chilled water pump.

An embodiment of the present disclosure further provides an energy control device, comprising:

an acquisition module configured to acquire weather forecast information of an area where a controlled system is located in a preset future time period;

a determination module configured to determine an optimal energy flowing configuration of the controlled system in the preset future time period according to the weather forecast information and current energy storage information of the controlled system; and a control module configured to control the controlled system to run according to the optimal energy flowing configuration, so that the controlled system is in an optimal running state with maximum benefit in the preset future time period.

An embodiment of the present disclosure further provides a computer-readable storage medium having thereon stored a computer program which, when executed by a processor, implements the energy control method according to the embodiment of the present disclosure.

An embodiment of the present disclosure further provides an electronic equipment, comprising: at least one processor; and a memory in communication connection with the at least one processor, wherein the memory has thereon stored instructions that are executed by the at least one processor, the instructions are executed by the at least one processor so that the at least one processor implements the energy control method according to the embodiment of the present disclosure.

By applying the technical solution of the present disclosure, the weather forecast information can be acquired through the weather server, the intelligent energy flowing decision is provided in combination with the weather factor and the parameter of the controlled system, an optimal energy flowing configuration in the preset future time period is given, the controlled system is controlled to run according to the optimal energy flowing configuration, so that the controlled system is in the optimal running state with maximum benefit in the preset future time period, which effectively ensures maximization of comprehensive benefit of the system. Meanwhile, the power generation equipment, the energy storage equipment, and the air conditioning equipment in the controlled system are connected in parallel through the direct-current bus, loads are gathered together by using the direct-current bus, so that the direct-current bus is used as a medium for energy transmission, which can reduce system energy consumption and reduce system complexity.

DETAILED DESCRIPTION

To make the objectives, technical solutions and advantages of the present disclosure more apparent, the present disclosure will be further described in detail below with reference to the accompanying drawings, and it is apparent that the described embodiments are only some embodiments of the present disclosure, not all embodiments. All other embodiments, which can be derived by one of ordinary skill in the art from the embodiments in the present disclosure without making any creative effort, shall fall within the protection scope of the present disclosure.

Embodiment 1

This embodiment provides an energy control system, which can perform optimal configuration of energy flowing of a controlled system in combination with weather forecast information and a parameter of the controlled system, so that the controlled system is in an optimal running state with maximum benefit, and maximization of comprehensive benefit of the whole system is achieved.

Figure 1:
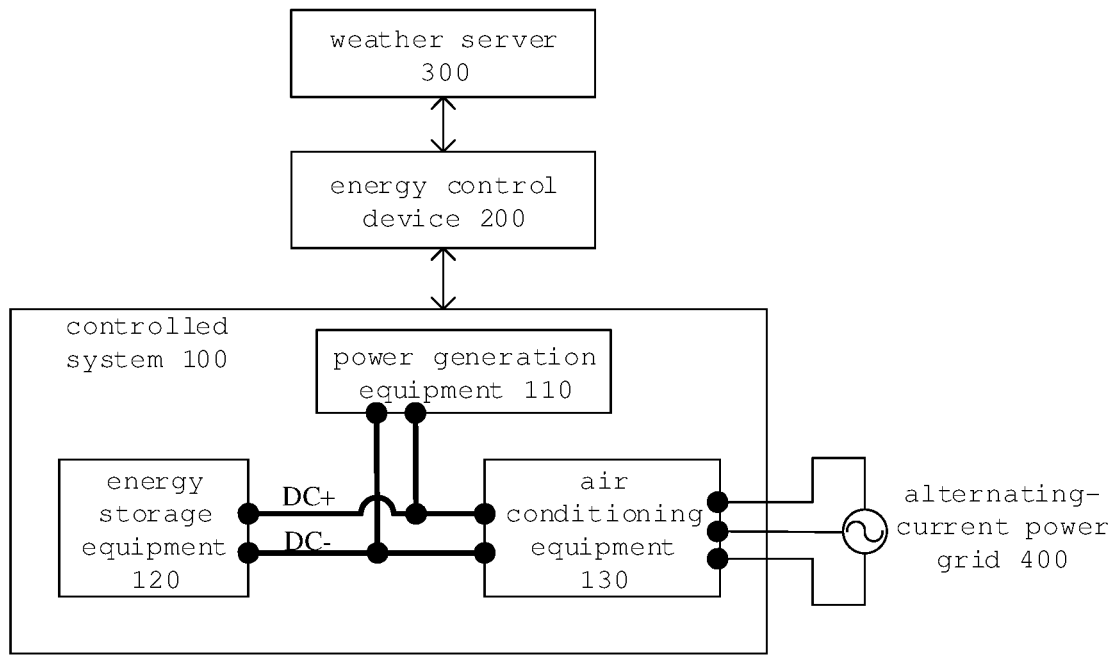
FIG. 1 is a schematic structural diagram of an energy control system according to Embodiment 1 of the present disclosure.

As shown in FIG. 1, the energy control system comprises: a controlled system 100, an energy control device 200, and a weather server 300.

The controlled system 100 comprises: a power generation equipment 110, an energy storage equipment 120, and an air conditioning equipment 130. The power generation equipment, the energy storage equipment and the air conditioning equipment are connected in parallel through a direct-current bus (comprising a positive bus DC+ and a negative bus DC−). The air conditioning equipment is also connected to an alternating-current power grid 400 (i.e., a utility power grid). The controlled system is a power generation/energy storage/air conditioning power consumption integrated system. The power generation equipment is, for example, a new-energy generation device. In some embodiments, the power generation equipment is a photovoltaic power generation equipment.

The weather server is used for providing weather forecast information, and by performing data access and request to the weather server, the weather forecast information can be obtained.

The energy control device is in communication connection with the controlled system and the weather server respectively, and is configured to acquire weather forecast information in a preset future time period from the weather server and send an optimal energy flowing configuration in the preset future time period to the controlled system.

In the embodiment, the weather forecast information can be acquired through the weather server, the intelligent energy flowing decision is provided in combination with the weather factor and the parameter of the controlled system, the optimal energy flowing configuration in the preset future time period is given, the controlled system is controlled to run according to the optimal energy flowing configuration, so that the controlled system is in the optimal running state with maximum benefit in the preset future time period, which effectively ensures maximization of comprehensive benefit of the system. Meanwhile, the power generation equipment, the energy storage equipment, and the air conditioning equipment in the controlled system are connected in parallel through the direct-current bus, and loads are gathered together through the direct-current bus, so that the direct-current bus is used as a medium for energy transmission, which can reduce system energy consumption and reduce system complexity.

The energy control device provides a communication interface for data transmission with the controlled system, such as a CAN (Controller Area Network) bus, an RS 485 (a serial communication standard), an industrial Ethernet or SPI (Serial Peripheral Interface) communication, and the like. The weather forecast information and the optimal energy flowing configuration are sent to the controlled system together, so that the energy storage equipment, the air conditioning equipment, and the power generation equipment in the controlled system can perform independent operation and running in combination with the weather forecast information.

Figure 2:
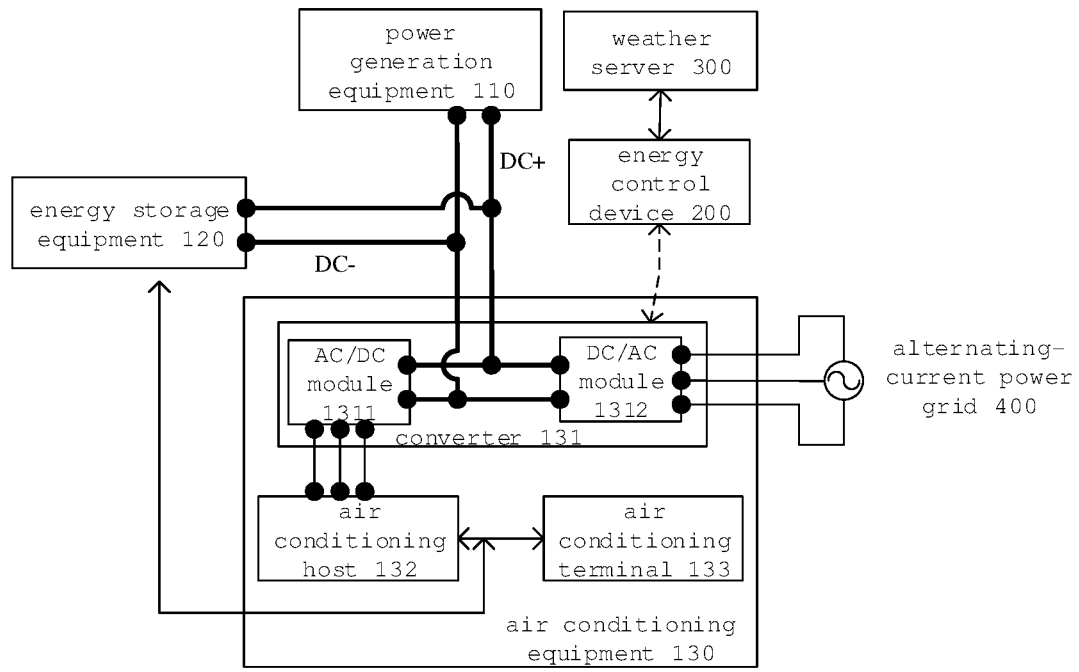
FIG. 2 is a schematic structural diagram of an air conditioning equipment in the energy control system according to Embodiment 1 of the present disclosure.

Referring to FIG. 2, the air conditioning equipment 130 comprises: a converter 131, an air conditioning host 132, and an air conditioning terminal 133. The converter 131 comprises: a first alternating-current end, a second alternating-current end, and a direct-current end. The first alternating-current end is connected to the alternating-current power grid 400, the second alternating-current end is connected to the air conditioning host 132, and the direct-current end is connected to the direct-current bus. Exemplarily, the converter 131 can be an AC\DC\AC integrated four-quadrant converter. The air conditioning host is connected with the air conditioning terminal through a chilled water circulation pipeline, and if the energy storage equipment comprises a cold energy storage component, the energy storage equipment is connected to the chilled water circulation pipeline between the air conditioning host and the air conditioning terminal. By providing the converter, control of energy flowing among the air conditioning host, the utility power and the direct-current bus can be realized.

In some embodiments, the converter 131 comprises: an AC/DC module 1311 and a DC/AC module 1312, the AC/DC module comprises a first end and a second end, the DC/AC module comprises a third end and a fourth end; the first end is used as the second alternating-current end of the converter; the second end is connected to the third end, and a connection point between the second end and the third end is used as the direct-current end of the converter (namely, the second end and the third end is both connected to the direct-current bus); and the fourth end is used as the first alternating-current end of the converter. Through the AC/DC module and the DC/AC module, conversion between direct-current and alternating-current and control of a flowing direction of electric energy can be realized.

The converter is in communication connection with the energy control device, wherein in some embodiments, the communication connection can be realized through a communication bus or data bus, as shown by a dashed line in FIG. 2.

Figure 3:
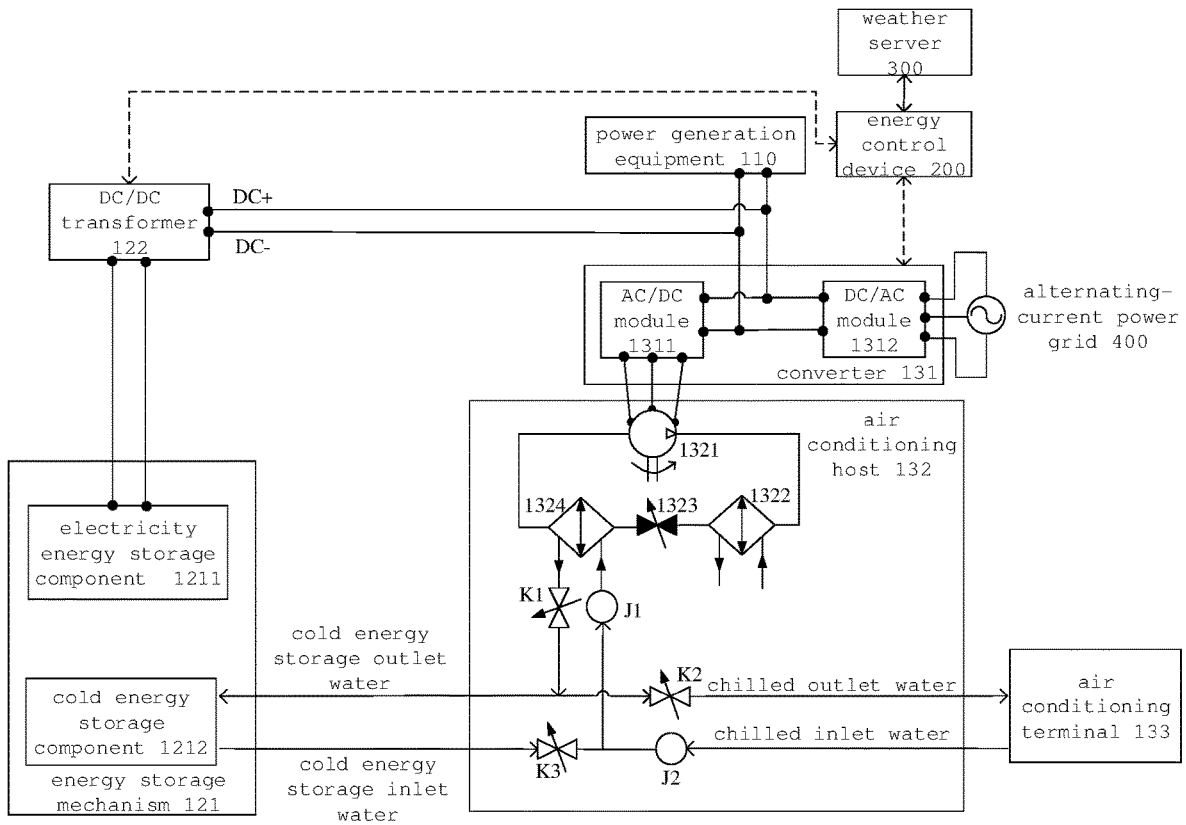
FIG. 3 is a schematic structural diagram of an energy storage equipment and an air conditioning host according to Embodiment 1 of the present disclosure.

Referring to FIG. 3, the air conditioning host 132 comprises: a compressor 1321, a condenser 1322, a throttling device 1323, and an evaporator 1324, the compressor 1321 is connected to the second alternating-current end of the inverter 131. By means of the connection between the converter and the air conditioning host and the communication connection between the converter and the energy control device, the converter can control related energy flowing of the air conditioning host.

Referring to FIG. 3, the energy storage equipment 120 comprises: an energy storage mechanism 121 and a DC/DC transformer 122. One end of the DC/DC transformer is connected to the energy storage mechanism, and the other end of the DC/DC transformer is connected to the direct-current bus; and the energy storage mechanism is also connected to the air conditioning equipment. By providing the DC/DC transformer, control of electric energy flowing between the energy storage equipment and the direct-current bus can be realized.

The energy storage mechanism 121 comprises: an electricity energy storage component 1211 and/or a cold energy storage component 1212, and a structure thereof is illustrated in FIG. 3 by taking an example that both the electricity energy storage component and the cold energy storage component are comprised, and in practical applications, a specific type of energy storage mechanism and its corresponding structure can be used as needed. The electricity energy storage component is connected to the DC/DC transformer. The cold energy storage component is connected to the air conditioning host and the air conditioning terminal in the air conditioning equipment, specifically through the chilled water circulation pipeline. The electricity energy storage component can be an energy storage battery, and the cold energy storage component can be a cold energy storage material.

In some embodiments, the evaporator in the air conditioning host is connected to the air conditioning terminal through a chilled water inlet pipeline and a chilled water outlet pipeline, the chilled water inlet pipeline is thereon sequentially provided with a chilled water pump J1 and a main water pump J2, the chilled water outlet pipeline is thereon sequentially provided with a first valve K1 and a second valve K2, wherein the chilled water pump and the first valve are close to the evaporator side. The cold energy storage component is connected between the first valve and the second valve through a first pipeline, the cold energy storage component is also connected between the chilled water pump and the main water pump through a second pipeline, the second pipeline is thereon provided with a third valve K3.

The chilled water pump is used for providing circulation power for chilled water inside the evaporator, and the main water pump is used for providing circulation power for chilled water in the chilled water circulation pipeline (namely, the chilled water outlet pipeline, the chilled water inlet pipeline, the first pipeline, and the second pipeline). The first valve, the second valve, and the third valve are used for controlling the pipelines where they are located to be on or off. The first valve, the second valve, and the third valve can receive a control signal or a control command sent by the converter.

Based on the specific connection of the cold energy storage component with the air conditioning host and the air conditioning terminal and the arrangement of the valves and the water pumps, control of cold energy storage and cold energy release of the cold energy storage component can be realized through the converter, such that the system can run in optimization and economic maximization.

The DC/DC transformer is in communication connection with the energy control device, and in some embodiments, the communication connection can be realized through a communication bus or data bus, as shown by a dashed line in FIG. 3. Control of charging and discharging of the electricity energy storage component can be realized through the DC/DC transformer, such that system can run in optimization and economic maximization.

In some embodiments, the energy control system can further comprise: a communication module, connected between the energy control device and the weather server. The communication module mainly provides a high-speed, stable and reliable network communication channel for accessing the weather server. Exemplarily, the communication module can be a GPRS module.

In some embodiments, the energy control system can further comprise: a background data monitoring server, in communication connection with the energy control device. In some embodiments, the background data monitoring server communicates with the energy control device through the communication module, and the energy control device can upload data of the controlled system to the background data monitoring server through the communication module. The communication module provides a high-speed, stable and reliable network communication channel for uploading the communication data of the controlled system to the background data monitoring server.

Embodiment 2

Figure 4:
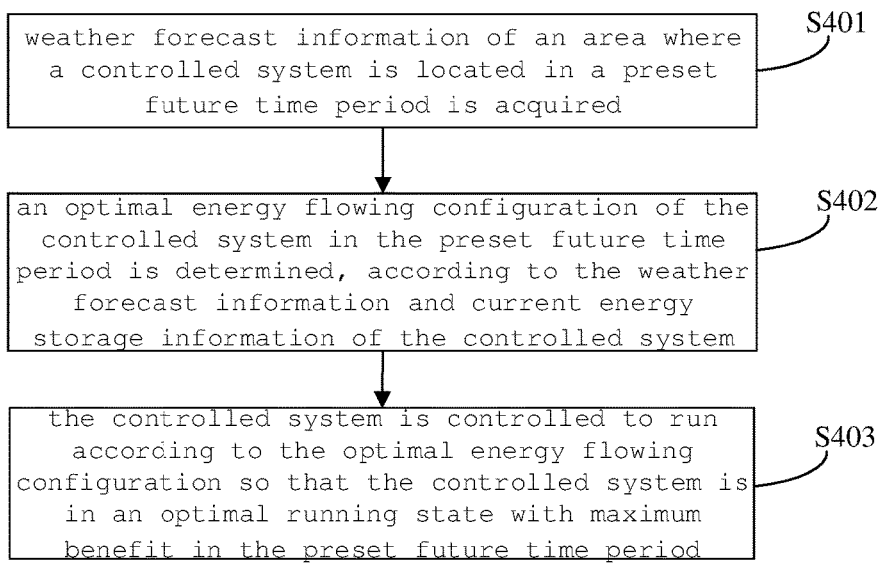
FIG. 4 is a flow diagram of an energy control method according to Embodiment 2 of the present disclosure.

Based on the same concept, this embodiment provides an energy control method, which is applied to the energy control system according to the above embodiment and can be executed by the energy control device. As shown in FIG. 4, the method comprises:

S401, weather forecast information of an area where a controlled system is located in a preset future time period is acquired.

The preset future time period can be set according to actual needs, for example, 6 hours or 3 days in future. A maximum value of the preset future time period is a forecast duration provided by weather forecast, i.e. the preset future time period can be any value within the forecast duration.

S402, an optimal energy flowing configuration of the controlled system in the preset future time period is determined, according to the weather forecast information and current energy storage information of the controlled system.

The current energy storage information of the controlled system refers to information on energy currently stored in an energy storage equipment of the controlled system. The energy storage information can comprise: electricity storage information and/or cold energy storage information, which is specifically determined according to a type of the energy storage equipment contained in the controlled system. Exemplarily, the current energy storage information comprises: current stored electricity energy and/or current stored cold energy. The optimal energy flowing configuration is power proportioning data that enables the controlled system to be in an optimal running state with maximum benefit. The optimal energy flowing configuration in the preset future time period comprises an optimal energy flowing configuration at each time moment in the preset future time period.

S403, the controlled system is controlled to run according to the optimal energy flowing configuration so that the controlled system is in an optimal running state with maximum benefit in the preset future time period. In some embodiments, the energy control device pushes the optimal energy flowing configuration (which can be sent in a form of a control command) to related equipment or devices in the controlled system through a communication bus or data bus.

In the embodiment, the weather forecast information of the area where the controlled system is located in the preset future time period is acquired, the optimal energy flowing configuration of the controlled system in the preset future time period is determined according to the weather forecast information and the current energy storage information of the controlled system, the controlled system is controlled to run according to the optimal energy flowing configuration in the preset future time period, and an intelligent energy flowing decision is provided by combining a weather factor and a parameter of the controlled system, so that the controlled system is in the optimal running state with maximum benefit in the preset future time period, which effectively ensures maximization of comprehensive benefit of the system.

In some embodiments, the weather forecast information can be acquired regularly, and each time the weather forecast information is acquired, an optimal energy flowing configuration of a corresponding weather forecast time period will be calculated. If two consecutive forecast time periods overlap, a latter optimal energy flowing configuration can be used to correct a former optimal energy flowing configuration, and in some embodiments, the controlled system is controlled according to a latter operation result, or an average value of each parameter at each time moment in the two optimal energy flowing configurations is calculated as a final configuration. In addition, if the energy control device receives a request from a background data monitoring server, it will feed back requested data to the background data monitoring server.

In some embodiments, the determining an optimal energy flowing configuration of the controlled system in the preset future time period, according to the weather forecast information and current energy storage information of the controlled system comprises: estimating electricity energy generated by a power generation equipment at each time moment in the preset future time period according to the weather forecast information; estimating cold energy required by an air conditioning equipment at each time moment in the preset future time period according to a preset rule; and performing evolutionary operation on an objective function to obtain the optimal energy flowing configuration according to the generated electricity energy at each time moment, the required cold energy at each time moment, the current energy storage information, and an energy balance formula of the controlled system.

Electricity generation of a new-energy generation device is related to a weather condition, and the generated electricity can be estimated according to the weather forecast information. The preset rule refers to a rule for estimating a refrigeration demand of the air conditioning equipment, and for example, estimation can be performed according to an actual use area, historical running, and the like of an air conditioning equipment. The evolutionary operation is performed on the objective function, that is, an optimal solution of the objective function is solved and the optimal solution is taken as the optimal energy flowing configuration.

In the embodiment, the evolutionary operation is performed on the objective function according to the electricity generation information, the energy storage information, the refrigeration demand and the energy balance formula of the controlled system, so that a reasonable optimal energy flowing configuration can be ensured, and further, optimal running and benefit maximization of the system are ensured.

Further, the objective function is:

$$\min_{0-\tau} y(t) = \min_{0-\tau} f(f_1(t), f_2(t)),$$

$$\text{wherein } \begin{cases} f_1(t) = \int_0^\tau m(t)p(t)d(t) \\ f_2(t) = c(t) - h_M(t) \end{cases},$$

$\tau$ denotes a duration of the preset future time period, t denotes a time moment in the preset future time period, $f_1(t)$ denotes an electricity charge budget of the controlled system, m(t) denotes an electricity price of an alternating-current power grid, p(t) denotes electricity consumption power of the controlled system to the alternating-current power grid, $f_2(t)$ denotes a difference between required cold energy of the controlled system and actual supply cold energy, c(t) denotes refrigeration power required by an air conditioning terminal in the controlled system, $h_M(t)$ denotes actual refrigeration power of the air conditioning terminal in the controlled system.

For the evolutionary operation in this embodiment, an existing algorithm can be used, which is not limited in this embodiment. Exemplarily, a hierarchical solution method can be used, so that importance ranking is performed on the objective function, and optimization solution is performed on a single objective in turn according to the ranking.

By solving the optimal solution of the above objective function, the controlled system runs according to the optimal solution in the preset future time period, so that minimum electricity charge of the controlled system can be ensured and balance between supply and demand of cold energy can be kept, that is, the optimal running state and benefit maximization are realized.

The energy balance formula is as follows:

$$\begin{cases} 0 = c(t) - c_S(t) - c_M(t) \\ 0 = p(t) - p_M(t) + p_P(t) - p_{SP}(t) \\ 0 = c_M(t) - \eta p_M(t) \\ 0 = p_P(t) - h_P(t)T(t) \\ 0 = p_{A(n+1)}(t) - \int_0^\tau p_{SP}(t)d(t) - p_{A(n)}(t) \\ 0 = c_{A(n+1)}(t) - \int_0^\tau c_S(t)d(t) - c_{A(n)}(t) \end{cases},$$

wherein τ denotes a duration of the preset future time period, t denotes a time moment in the preset future time period, c(t) denotes refrigeration power required by an air conditioning terminal in the controlled system, $c_S(t)$ denotes cold energy storage power, $c_M(t)$ denotes refrigeration power of heat exchange of a compressor, p(t) denotes electricity consumption power of the controlled system to the alternating-current power grid, $p_M(t)$ denotes electricity consumption power of energy-consumption heat exchange of the compressor, $p_P(t)$ denotes actual electricity generation power, $p_{SP}(t)$ denotes electricity storage power, η denotes heat exchange efficiency of the compressor, $h_P(t)$ denotes an efficiency function of electricity generation power corresponding to a weather condition, T(t) denotes a weather function, $p_{A(n)}(t)$ denotes current actual stored electricity energy of an energy storage equipment at an initial time moment of the operation, $p_{A(n+1)}(t)$ denotes real-time stored electricity energy in the preset future time period that is obtained by the operation, $c_{A(n)}(t)$ denotes current actual stored cold energy of the energy storage equipment at the initial time moment of the operation, and $c_{A(n+1)}(t)$ denotes real-time stored cold energy in the future preset time that is obtained by the operation.

Each equation in the above energy balance formula is for energy balance at a certain time moment t in the preset future time period, and a value of each parameter represents a value at the certain time moment t. n represents a last evolutionary operation, and n+1 represents a current evolutionary operation. The initial time moment of the operation refers to the initial time moment of the current operation, for example, for a current time moment when weather forecast information is acquired, current actual stored electricity energy corresponding to the time moment represents existing energy of the energy storage equipment, and needs to be used as a basis of the current evolutionary operation.

The meanings of the equations in the above energy balance formula are as follows: the first equation represents balance between cold energy demand and stored cold energy as well as compressor refrigeration; the second equation represents power balance between devices connected in parallel through the direct-current buses DC+ and DC−; the third equation represents a relation between energy consumption and cold energy of the compressor; the fourth equation represents a relation between the electricity generation power and weather; the fifth equation represents a relation between the real-time stored electricity energy in the electricity energy storage component and energy flowing; and the sixth equation represents a relation between the real-time stored cold energy in the cold energy storage component and energy flowing.

It should be noted that the above energy balance formula is a general formula, for example, if the energy storage equipment in the controlled system only relates to electricity storage, a value of a parameter related to cold energy storage in the above energy balance formula is 0.

The above energy balance formula can fully reflect an energy balance situation of the controlled system, so that performing the evolutionary operation on the objective function based on the energy balance formula enables the evolutionary operation result to conform to an energy balance regularity of the controlled system, thereby better using the evolutionary operation result to control the running of the controlled system to achieve the optimal energy control.

A limiting condition of the energy balance formula is:

$$\begin{cases} C_T \geq c(t) \\ C_S \geq c_S(t) \\ C_M \geq c_M(t) \\ P_T \geq p(t) \\ P_M \geq p_M(t) \\ p_M(t) \geq 0 \\ p_S(t) \geq 0 \\ P_{SP} \geq |p_{SP}(t)| \\ C \geq c_{An}(t) \\ P \geq p_{An}(t) \\ p_{An}(t) \geq 0 \\ c_{An}(t) \geq 0 \end{cases},$$

wherein $C_T$ denotes a maximum power limit of the refrigeration power required by the air conditioning terminal in the controlled system, $C_S$ denotes a maximum power limit of the cold energy storage power, $C_M$ denotes a maximum power limit of the refrigeration power of the heat exchange the compressor, $P_T$ denotes a maximum power limit of the electricity consumption power of the controlled system to the alternating-current power grid, $P_M$ denotes a maximum power limit of the electricity consumption power of the energy-consumption heat exchange of the compressor, $p_S(t)$ denotes estimated electricity generation power, $P_{SP}$ denotes a maximum power limit of the electricity storage power, C denotes maximum stored cold energy, and P denotes maximum stored electricity energy.

The above limiting condition can make the evolutionary operation performed within an effective numerical range, so that reasonability and reliability of the evolutionary operation result are ensured.

The optimal energy flowing configuration comprises: in the preset future time period, the electricity consumption power of the controlled system to the alternating-current power grid at each time moment, the electricity consumption power of the energy-consumption heat exchange of the compressor at each time moment, the estimated electricity generation power at each time moment, the refrigeration power required by the air conditioning terminal at each time moment, the refrigeration power of the heat exchange of the compressor at each time moment, energy storage power at each time moment, and stored energy at each time moment, wherein the energy storage power at each time moment comprises: the electricity storage power at each time moment and/or the cold energy storage power at each time moment, the stored energy at each time moment comprises the stored electricity energy at each time moment and/or the stored cold energy at each time moment.

The controlling the controlled system to run according to the optimal energy flowing configuration refers to controlling, at each time moment in the preset future time period, the controlled system to run according to an optimal energy flowing configuration corresponding to that time moment, thereby enabling the controlled system to be in the optimal running state with maximum benefit in the preset future time period.

Correspondingly, corresponding to the content contained in the optimal energy flowing configuration, the controlling the controlled system to run according to the optimal energy flowing configuration comprises at least one of:

controlling, through a converter in the air conditioning equipment, energy flowing between the alternating-current power grid and a direct-current bus according to the electricity consumption power of the controlled system to the alternating-current power grid in the optimal energy flowing configuration;

controlling, through the converter in the air conditioning equipment, energy flowing between the compressor and the direct-current bus according to the electricity consumption power of the energy-consumption heat exchange of the compressor in the optimal energy flowing configuration;

controlling energy flowing between the power generation equipment and the direct-current bus according to the estimated electricity generation power in the optimal energy flowing configuration;

controlling, through a DC/DC transformer in the energy storage equipment, energy flowing between an electricity energy storage component in the energy storage equipment and the direct-current bus according to the electricity storage power in the optimal energy flowing configuration;

controlling, through the converter in the air conditioning equipment, energy flowing among a cold energy storage component in the energy storage equipment, an evaporator in an air conditioning host, and the air conditioning terminal, according to the cold energy storage power, the refrigeration power required by the air conditioning terminal, and the refrigeration power of the heat exchange of the compressor in the optimal energy flowing configuration; or controlling heat exchange between the air conditioning terminal and an area environment where the air conditioning terminal is located according to the refrigeration power required by the air conditioning terminal in the optimal energy flowing configuration.

Each of the above steps will be respectively specifically described below, and at least one of the steps can be performed at any time moment in the preset future time period.

(1) The controlling, through a converter in the air conditioning equipment, energy flowing between the alternating-current power grid and a direct-current bus according to the electricity consumption power of the controlled system to the alternating-current power grid in the optimal energy flowing configuration comprises:

if the electricity consumption power of the controlled system to the alternating-current power grid is greater than 0, controlling a DC/AC module in the converter to start a controllable rectification mode, control voltage of the direct-current bus, rectify alternating-current of the alternating-current power grid into direct-current, and control electric energy to flow from the alternating-current power grid to the direct-current bus; in some embodiments, electric energy on the direct-current bus can be supplied to the electricity energy storage component for electricity storage or to the air conditioning equipment as needed;

if the electricity consumption power of the controlled system to the alternating-current power grid is less than 0, controlling the DC/AC module in the converter to start a controllable rectification mode, to control the voltage of the direct-current bus, to invert direct-current of the direct-current bus into alternating-current, and feed the alternating-current back to the alternating-current power grid to realize the feedback of generated electricity to the power grid; and if the electricity consumption power of the controlled system to the alternating-current power grid is equal to 0, controlling the DC/AC module in the converter to start a direct-current voltage stabilization mode, to stabilize the voltage of the direct-current bus to MPPT (Maximum Power Point Tracking) voltage of the power generation equipment, so that the power generation equipment is in maximum power for output under the current weather condition.

(2) The controlling, through the converter in the air conditioning equipment, energy flowing between the compressor and the direct-current bus according to the electricity consumption power of the energy-consumption heat exchange of the compressor in the optimal energy flowing configuration comprises:

if the electricity consumption power of the energy-consumption heat exchange of the compressor is greater than 0, which represents that the compressor needs electricity consumption for the running, controlling an AC/DC module in the converter to invert direct-current of the direct-current bus into alternating-current, and controlling electric energy to flow from the direct-current bus to the compressor, so that the compressor stably runs to the power $p_M(t)$ required by the cold energy; and if the electricity consumption power of the energy-consumption heat exchange of the compressor is equal to 0, which represents that the compressor does not work, controlling the AC/DC module in the converter to stop the inversion function, and controlling the compressor to stand by.

(3) The controlling energy flowing between the power generation equipment and the direct-current bus according to the estimated electricity generation power in the optimal energy flowing configuration comprises:

if the estimated electricity generation power is greater than 0, controlling the power generation equipment to be in a power generation mode, and controlling electric energy to flow from the power generation equipment to the direct-current bus; and if the estimated electricity generation power is equal to 0, controlling the power generation equipment to stop generating electricity and to be in an open-circuit state.

(4) The controlling, through a DC/DC transformer in the energy storage equipment, energy flowing between an electricity energy storage component in the energy storage equipment and the direct-current bus according to the electricity storage power in the optimal energy flowing configuration comprises:

if the electricity storage power is greater than 0, which represents that the electricity energy storage component needs to be in a charging state, at this time, converting electric energy of the direct-current bus, through the DC/DC transformer in the energy storage equipment to charge the electricity energy storage component, so that electric energy is controlled to flow from the direct-current bus to the electricity energy storage component;

if the electricity storage power is equal to 0, controlling the DC/DC transformer to be in a standby state, and controlling the electricity energy storage component to be in a standby energy storage state; and if the electricity storage power is less than 0, which represents that the electricity energy storage component needs to be in a discharging state, at this time, converting electricity energy taken from the electricity energy storage component, through the DC/DC transformer, to be supplied to the direct-current bus, so that electricity energy is controlled to flow from the electricity energy storage component to the direct-current bus.

(5) The controlling heat exchange of the air conditioning terminal with an area environment where the air conditioning terminal is located according to the refrigeration power required by the air conditioning terminal in the optimal energy flowing configuration comprises:
if the refrigeration power required by the air conditioning terminal is greater than 0, the air conditioning terminal supplying cold to the area where the air conditioning terminal is located; and if the refrigeration power required by the air conditioning terminal is equal to 0, the air conditioning terminal having no heat exchange with the area environment where the air conditioning terminal is located, which is equivalent to a standby state.

(6) The controlling, through the converter in the air conditioning terminal, energy flowing among a cold energy storage component in the energy storage equipment, an evaporator in an air conditioning host, and the air conditioning terminal according to the cold energy storage power, the refrigeration power required by the air conditioning terminal, and the refrigeration power of the heat exchange of the compressor in the optimal energy flowing configuration comprises:
if the cold energy storage power is greater than 0, controlling the cold energy storage component to be in a cold energy storage state, in some embodiments, controlling a first valve, a third valve and a chilled water pump to be opened through the converter to perform cold energy storage on the cold energy storage component, and controlling chilled water to flow in a cold energy storage state of the cold energy storage component according to the refrigeration power required by the air conditioning terminal;
if the cold energy storage power is equal to 0, controlling the cold energy storage component to suspend cold energy storage and cold energy release, in some embodiments, controlling the third valve to be closed through the converter, and controlling the chilled water to flow in a standby state of the cold energy storage component according to the refrigeration power required by the air conditioning terminal; and
if the cold energy storage power is less than 0, controlling the cold energy storage component to be in a cold energy release state, in some embodiments, controlling the third valve to be opened through the converter to enable the cold energy storage component to release cold energy, and controlling cold energy supply of the air conditioning terminal according to the refrigeration power of the heat exchange of the compressor,
wherein the evaporator in the air conditioner host is connected to the air conditioning terminal through a chilled water inlet pipe and a chilled water outlet pipe, the chilled water inlet pipe is thereon sequentially provided with a chilled water pump and a main water pump, the chilled water outlet pipe is thereon sequentially provided with the first valve and a second valve, the chilled water pump and the first valve are close to the evaporator side; and the cold energy storage component is connected between the first valve and the second valve through a first pipeline, and the cold energy storage component is also connected between the chilled water pump and the main water pump through a second pipeline, the second pipeline is thereon provided with the third valve.

The energy control device can send, through the converter, a related control instruction to the air conditioning host and a related device in the air conditioning terminal.

In some embodiments, the controlling chilled water to flow in a cold energy storage state of the cold energy storage component according to the refrigeration power required by the air conditioning terminal comprises:
if the refrigeration power required by the air conditioning terminal is equal to 0, outputting a first control signal through the converter, wherein the first control signal is used for controlling the second valve and the main water pump to be closed; and
if the refrigeration power required by the air conditioning terminal is greater than 0, outputting a second control signal through the converter, wherein the second control signal is used for controlling the second valve and the main water pump to be opened, and controlling a flow of the main water pump to be less than a flow of the chilled water pump, so that the flow of the water pump can be controlled through a frequency converter matched with the water pump.

In some embodiments, the controlling the chilled water to flow in a standby state of the cold energy storage component according to the refrigeration power required by the air conditioning terminal comprises:
if the refrigeration power required by the air conditioning terminal is equal to 0, outputting a third control signal through the converter, wherein the third control signal is used for controlling the first valve, the second valve, the chilled water pump, and the main water pump to be all closed, so that chilled water in the pipeline stops flowing; and
if the refrigeration power required by the air conditioning terminal is greater than 0, outputting a fourth control signal through the converter, wherein the fourth control signal is used for controlling the first valve, the second valve, the chilled water pump, and the main water pump to be all opened, and controlling the flow of the main water pump to be equal to the flow of the chilled water pump, so that the flow of the water pump can be controlled through the frequency converter matched with the water pump.

In some embodiments, the controlling cold energy supply of the air conditioning terminal according to the refrigeration power of the heat exchange of the compressor comprises:
if the refrigeration power of the heat exchange of the compressor is equal to 0, determining that required cold energy is supplied by the cold energy storage component to the air conditioning terminal, and outputting a fifth control signal through the converter, wherein the fifth control signal is used for controlling the first valve and the chilled water pump to be closed, and controlling the second valve and the main water pump to be opened; and
if the refrigeration power of the heat exchange of the compressor is greater than 0, determining that the required cold energy is jointly supplied by the compressor and the cold energy storage component to the air conditioning terminal, and outputting a sixth control signal through the converter, wherein the sixth control signal is used for controlling the first valve, the second valve, the chilled water pump, and the main water pump to be all opened, and controlling the flow of the main water pump to be greater than the flow of the chilled water pump, so that the flow of the water pump can be controlled through the frequency converter matched with the water pump.

Embodiment 3

The above energy control system and method will be described below in combination with a specific embodiment, however, it should be noted that the specific embodiment is only for better describing the present application and does not constitute an improper limitation of the present application. For a term that is the same as or corresponds to that in the above embodiment, an repeated explanation will be not made in this embodiment.

This embodiment is described by taking an example that a photovoltaic/energy storage/air conditioning compressor integrated system is taken as a controlled system, which has both functions of electricity storage and cold energy storage.

Figure 5:
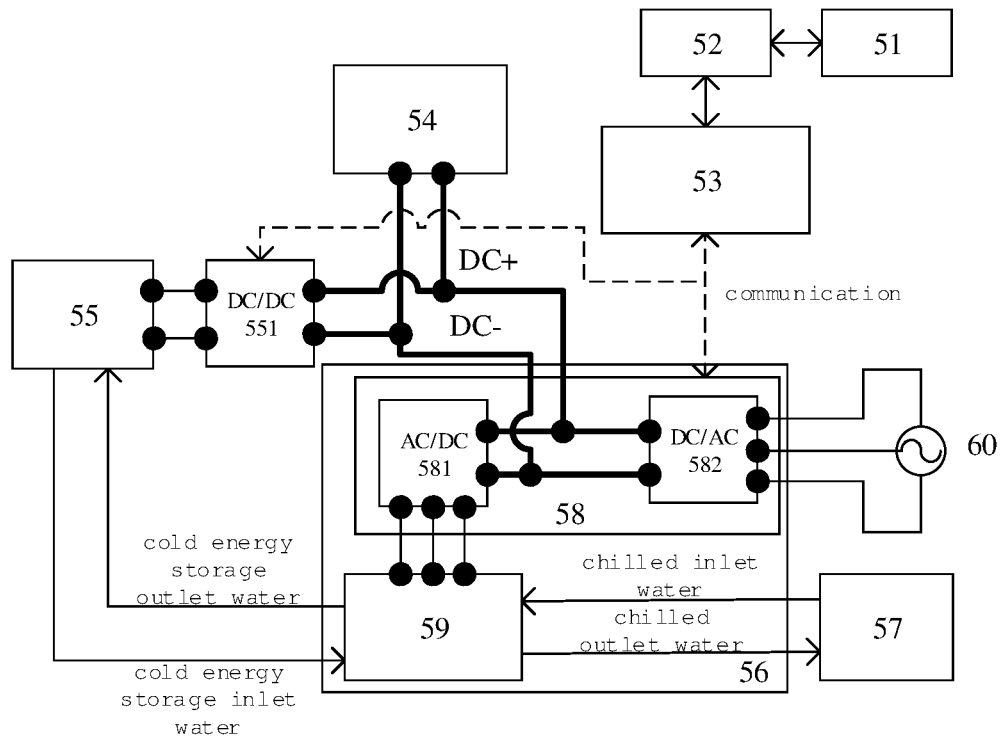
FIG. 5 is a schematic structural diagram of an energy flowing intelligent decision system for a photovoltaic/energy storage/air conditioning compressor integrated system according to Embodiment 3 of the present disclosure.

Reference is made to FIG. 5, which is a schematic structural diagram of an energy flowing intelligent decision system (equivalent to the above energy control system) for a photovoltaic/energy storage/air conditioning compressor integrated system, the energy flowing intelligent decision system comprising:

a network server 51 (equivalent to the weather server in the Embodiment 1), wherein weather forecast information can be acquired by accessing the network server, and in this embodiment, the network server is mainly to provide the weather forecast information for an energy flowing intelligent decision based on an access request.

A GPRS module 52 (equivalent to the communication module in the Embodiment 1), which mainly provides a high-speed, stable and reliable network communication channel, and specifically provides a network communication channel for uploading communication data of the integrated system to a background data monitoring server and accessing the network server.

An optimized comprehensive control system 53 (equivalent to the energy control device in the Embodiment 1), wherein on one hand, the optimized comprehensive control system provides an interface (such as a CAN bus, an RS485, an industrial Ethernet or an SPI communication, etc.) for the uploading of the data of the communication bus of the integrated system, and pushes the data to the GPRS module to be uploaded to the background data monitoring server; on the other hand, the optimized comprehensive control system processes the weather forecast information acquired by accessing the network server through the GPRS module, pushes the weather forecast information to a data bus of the integrated system for sharing by each subsystem in the integrated system, and according to an energy flowing regularity of the integrated system in combination with the weather forecast information, performs evolutionary operation on system benefit, solves an optimal solution to correct a running plan, and sends the corrected plan to each subsystem in the integrated system through the communication bus of the integrated system for running control.

The subsystems specifically refer to: a photovoltaic converter, a compressor system, an energy storage system, and an air conditioning terminal (specifically an air conditioning terminal evaporator). The optimized comprehensive control system operates optimal energy flowing storage and distribution among the photovoltaic, energy storage, compressor, and utility power grid in combination with the weather forecast information and an running state of each subsystem, then pushes control information corresponding to the energy flowing storage and distribution into the communication bus, a water circulation control valve in the compressor system, a DC/DC transformer at a front end of the energy storage system, and the photovoltaic converter, which are in the integrated system, execute a control instruction, so that energy flowing control between stored electricity and stored cold energy is realized, and benefit maximization within a certain future time period is realized through optimized energy distribution among the photovoltaic, the stored cold energy, the stored electricity, and the utility power grid. The weather forecast information can be pushed into the communication bus together with the control information corresponding to the energy flowing storage and distribution obtained through the operation, an interface is reserved for independent operation and running of the energy storage system and the air conditioning compressor system in combination with the weather condition, and an information interaction channel with an air conditioning group control system inside a building is reserved.

The integrated system comprises: a photovoltaic panel 54 (equivalent to the power generation equipment in the Embodiment 1), an energy storage system 55 (equivalent to the energy storage equipment in the Embodiment 1), an air conditioning compressor system 56, and an air conditioning terminal 57. The air conditioning compressor system 56 comprises a photovoltaic converter 58 (equivalent to the converter in the Embodiment 1) and a compressor system 59 (equivalent to the air conditioning host in the Embodiment 1).

The energy storage system. 55 comprises: an electricity energy storage component and a cold energy storage component, wherein the electricity energy storage controls, through a DC/DC transformer 551 at a front end of the energy storage, charging and discharging of an energy storage battery; and the cold-storage energy storage controls, through the photovoltaic converter 58, an on/off state of an electronic control valve for a water circulation pipeline, a state of a chilled water pump, and a state of a main water pump, so that state control of cold energy storage and cold energy release of the cold-storage energy storage is realized.

The DC/DC transformer mainly controls an energy flowing (namely the charging/discharging of the energy storage battery) of the electricity energy storage at the energy storage side, such that the system can run in optimization and economic maximization.

The photovoltaic converter 58 can be specifically an AC\DC\AC integrated four-quadrant converter, which comprises an AC/DC module 581 and a DC/AC module 582, and the photovoltaic converter has one alternating-current end connected to a three-phase alternating-current power grid 60, the other alternating-current end connected to the air conditioning compressor, and a direct-current end connected to a direct-current bus, that is, connected to the photovoltaic panel and the DC/DC transformer at the front end of the energy storage through the direct-current bus. The photovoltaic converter can provide a control instruction for the water circulation electronic control valve in the air conditioning equipment.

Figure 6:
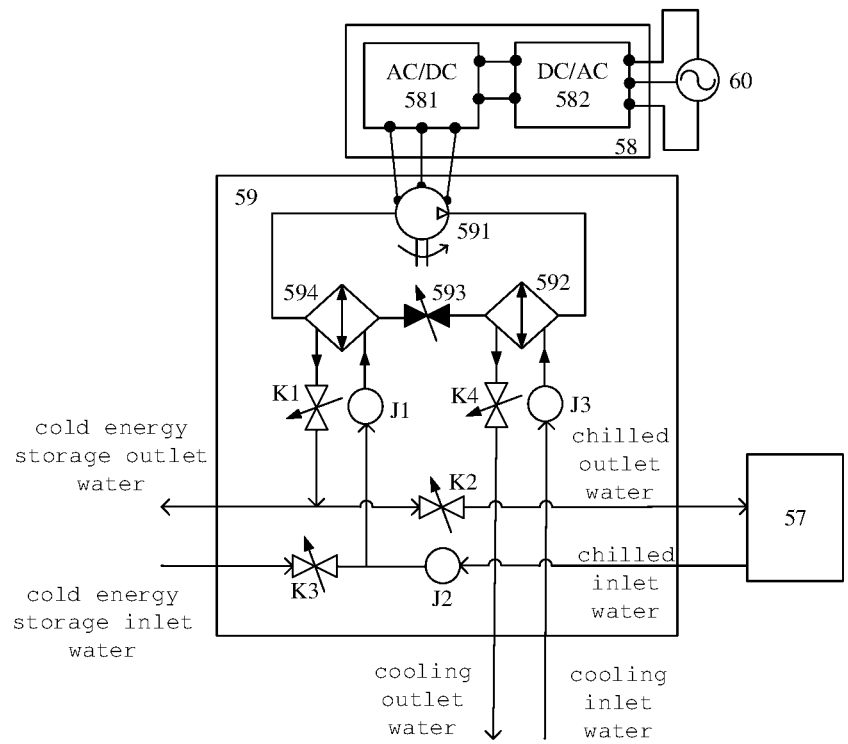
FIG. 6 is a schematic structural diagram of an air conditioning equipment in the energy flowing intelligent decision system for a photovoltaic/energy storage/air conditioning compressor integrated system according to Embodiment 3 of the present disclosure.

Referring to FIG. 6, the compressor system 59 comprises: a compressor 591, a condenser 592, an electronic control proportional valve 593, and an evaporator 594. The compressor can be a centrifugal air compressor or a screw type air compressor, and is a main device for performing energy-consumption heat exchange between chilled water circulation inside a building where the air conditioning equipment is located and cooling water circulation of a cooling tower outside the building. The compressor system further comprises: a chilled water pump J1, a main water pump J2, a cooling water pump J3, a chilled water circulation pipeline, a cooling water circulation pipeline, and related electronic control valves K1 to K4.

The compressor pressurizes low-pressure gaseous refrigerant in the evaporator into high-pressure gaseous refrigerant by means of electric energy provided by the photovoltaic converter, and pushes the high-pressure gaseous refrigerant into the condenser. The condenser makes cooling water absorb heat of the high-pressure gaseous refrigerant, so that the refrigerant is liquefied into liquid refrigerant. The evaporator makes the liquid refrigerant absorb heat of chilled inlet water, the refrigerant is converted into gaseous refrigerant, and the gaseous refrigerant is sucked into the compressor. The electronic control proportional valve (equivalent to the throttling device in the Embodiment 1) can control a flowing rate of liquid refrigerant in a refrigerant pipeline between the condenser and the evaporator by controlling an on/off state and an opening size of the electronic control proportional valve, to play a role of throttling. The electronic control valves K1 to K4 can receive an electronic control signal of the photovoltaic converter, to change their own on/off states so that related pipelines are controlled to be on/off. The chilled water pump provides circulation power for chilled water in the evaporator. The main water pump provides circulation power for chilled water in the chilled water circulation pipeline. The cooling water pump provides circulation power for cooling water in the cooling water circulation pipeline.

Figure 7:
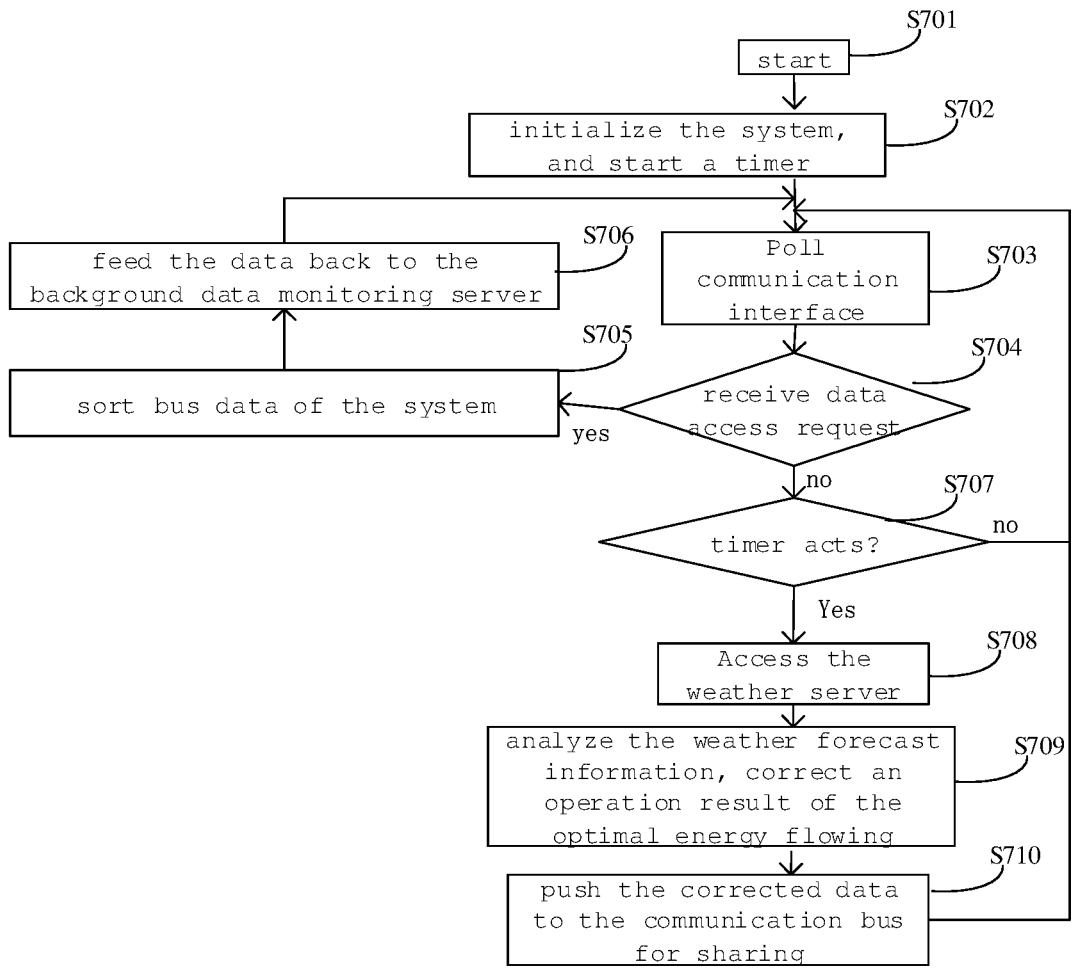
FIG. 7 is a work flow diagram of the energy flowing intelligent decision system for a photovoltaic/energy storage/air conditioning compressor integrated system according to Embodiment 3 of the present disclosure.

Referring to FIG. 7, which is a work flow diagram of an energy flowing intelligent decision system for a photovoltaic/energy storage/air conditioning compressor integrated system, a work flow of energy control mainly comprises:

S701, starting the integrated system, starting the optimized comprehensive control system, and starting the energy control flow.

S702, initializing the optimized comprehensive control system, finishing the initialization, and starting a timer, which is used for regularly accessing the network server.

S703, the optimized comprehensive control system entering a main program to poll a communication interface.

S704, judging whether a data access request from the background data monitoring server is received, and if the data access request is received, entering step S705, if the data access request is not received, entering step S707.

S705, sorting requested data, namely working data of the unit.

S706, feeding back the sorted data to the background data monitoring server.

S707, judging whether a timer interrupt exists, and if the timer interrupt exists, entering step S708; if the timer interrupt does not exist, returning to the step S703. The execution order of the steps S704 and S707 can be exchanged, or they can be executed simultaneously.

S708, when the timer interrupt action is detected, accessing the network server, and requesting the weather forecast information.

S709, after the weather forecast information is received, correcting a unit energy flowing plan in the preset future time period according to the weather forecast information and the parameter of the integrated system.

S710, pushing the energy flowing plan to the communication bus for sharing, to realize control of an optimized working state of the integrated system.

The energy control process of the optimized work of the integrated system is specifically as follows:

assuming that a real-time power grid cost budget of the photovoltaic/energy storage/air conditioning compressor integrated system is $f_1(t)$, and a difference between required cold energy of a building and actual supply cold energy is $f_2(t)$, so that:

$$\begin{cases} f_1(t) = \int_0^\tau m(t)p(t)d(t) \\ f_2(t) = c(t) - h_M(t) \end{cases},$$

a real-time corresponding objective function is $$\min_{0-\tau} y(t) = \min_{0-\tau} f(f_1(t), f_2(t)).$$

The optimized comprehensive control system acquires the weather forecast information and current energy storage information of the integrated system, performs evolutionary operation based on the energy balance formula and its limiting condition (see the Embodiment 2 for details), solves an optimal solution (namely the power proportioning data) to the objective function, pushes a control instruction corresponding to the optimal solution to the data bus, the DC/DC transformer at the front end of the energy storage controls a real-time energy flowing of the electricity energy storage according to the power control data pushed via the bus, and the photovoltaic converter controls the compressor system and the AC/DC module and the DC/AC module inside the converter according to the power control data pushed via the bus, so that the control of the energy flowing among the utility power grid, the compressor and the cold-storage energy storage is realized.

In some embodiments, at a time moment 0 when the weather forecast information is received, the optimized comprehensive control system performs, under the limiting condition, evolutionary operation on the objective function $$\min_{0-\tau} y(t),$$

according to current energy storage information $p_{A(n)}(t)$ and $c_{A(n)}(t)$ and power and energy balance among subsystems, wherein the current energy storage information is pushed to the bus by the electricity energy storage component and the cold energy storage component at the time, obtains energy storage states of $p_{A(n+1)}(t)$ and $c_{A(n+1)}(t)$ under the optimal energy flowing configuration within a time period of $0\to\tau$ and $p(t)$, $p_M(t)$, $p_S(t)$, $p_{SP}(t)$, $c(t)$, $c_S(t)$, $c_M(t)$ at each time moment, and pushes the operation result to the data bus in the system.

At a certain time moment when the system works normally, when $p(t)>0$, the DC/AC module of the photovoltaic converter starts a controllable rectification mode, to control voltage of the direct-current bus, rectify three-phase alternating-current on the grid side into direct-current, and control electric energy to flow from the alternating-current power grid side to the direct-current bus side, and later, the electric energy on the direct-current bus can be stored or supplied to the compressor as needed; when $p(t)<0$, the DC/AC module of the photovoltaic converter starts a controllable rectification mode, to control the voltage of the direct-current bus, invert direct-current energy of the direct-current bus into three-phase alternating-current energy, and feed the three-phase alternating-current energy back to the three-phase alternating-current power grid side, so that a power generation and feedback to grid mode is realized; and when $p(t)=0$, the DC/AC module of the photovoltaic converter only starts a direct-current voltage stabilization mode, to stabilize the voltage of the direct-current bus to MPPT voltage of the photovoltaic generation.

At a certain time moment when the system works normally, when $p_M(t)>0$, the AC/DC module in the photovoltaic converter inverts the direct-current energy in the direct-current bus into three-phase alternating-current energy, controls the electric energy to flow from the direct-current bus to the compressor, so that the compressor stably runs to power $p_M(t)$ required by the cold energy; and when $p_M(t)=0$, the AC/DC module of the photovoltaic converter stops the inversion function so that the compressor stands by.

At a certain time moment when the system works normally, when $p_S(t)>0$, a photovoltaic panel is in a power generation mode so that electric energy flows from the photovoltaic panel to the direct-current bus; and when $p_S(t)=0$, the photovoltaic panel stops generation and in an open-circuit state.

At a certain time moment when the system works normally, when $p_{SP}(t)>0$, the electricity energy storage component is in a charging state, at the time, electric energy of the direct-current bus is converted through the bidirectional DC/DC transformer at the front end of the electricity energy storage, to charge the electricity energy storage, so that the energy is controlled to flow from the direct-current bus to the electricity energy storage system; when $p_{SP}(t)=0$, the DC/DC transformer at the front end of the energy storage is in a standby state, and the whole electricity energy storage component is in a standby energy storage state; and when $p_{SP}(t)<0$, the electricity energy storage component is in a discharging state, at the time, electric energy taken from the electricity energy storage system is converted through the bidirectional DC/DC transformer at the front end of the electricity energy storage, to be supplied to the direct-current bus, so that the energy flows from the electricity energy storage system to the direct-current bus.

At a certain time moment when the system works normally, when $c(t)>0$, the air conditioning terminal in the building supplies cold to the building at the time; and when $c(t)=0$, the air conditioning terminal in the building have no heat exchange with an environment inside the building at the time, which is equivalent to a standby state.

At a certain time moment when the system works normally, when $c_S(t)>0$, the cold energy storage component is in a cold-storage state, and at the time, the photovoltaic converter outputs a control signal to control states of electronic control valves K1 and K3 to be on, and the chilled water pump J1 is also in the on state since the compressor is in the running state, so that at this time, there are two states: state 1: if the refrigeration power required by the air conditioning terminal $c(t)=0$, the electronic control valve K2 and the main water pump J2 are not on, and referring to FIG. 6, flowing of a water flow in the chilled water pipeline at this time is: evaporator 594→K1→cold energy storage component (not shown in the figure)→K3→J1→evaporator 594; and state 2: if $c(t)>0$, at this time, the electronic control valve K2 and the main water pump J2 are in on state, and each water pump is controlled by its matched frequency converter so that a flow of the main water pump is less than that of the chilled water pump, and referring to FIG. 6, the flowing of the water flow in the chilled water pipeline at this time comprises: flowing for stored cold energy and flowing for the compressor supplying cold to the terminal, wherein the flowing for the stored cold energy is: evaporator 594→K1→cold energy storage component (not shown in the figure)→K3→J1→evaporator 594, and the flowing for the compressor supplying cold to the terminal is: evaporator 594→K1→K2→air conditioning terminal 57→J2→J1→evaporator 594.

When $c_S(t)=0$, the cold energy storage component suspends cold energy storage and cold energy release, and at this time, the electronic control valve K3 is closed, so that there are two states: state 1: if $c(t)=0$, none of the electronic control valves K1 and K2, the chilled water pump J1, and the main water pump J2 is on, so that chilled water in the water flow pipeline stopping flowing; and state 2: if $c(t)>0$, at this time, the electronic control valves K1 and K2, the main water pump J2, and the chilled water pump J1 are in the on state, and each water pump is controlled by its matched frequency converter so that the flow of the main water pump is equal to that of the chilled water pump, and referring to FIG. 6, the flowing of the water flow in the chilled water pipeline at this time is: evaporator 594→K1→K2→air conditioning terminal 57→J2→J1→evaporator 594.

When $c_S(t)<0$, the cold energy storage component is in a cold energy release state, so that at this time, there are two states: state 1: when $c_M(t)=0$, cold energy required by the air conditioning terminal at this time is all provided by the cold energy storage component, and at this time, the chilled water pump J1 and the electronic control valve K1 are closed, and the electronic control valves K2 and K3 and the main water pump J2 are opened, and referring to FIG. 6, the flowing of the water flow in the chilled water pipeline at this time is: cold energy storage component→K2→air conditioning terminal 57→J2→K3→cold energy storage component; and state 2: when $c_M(t)>0$, at this time, cold is jointly supplied by the compressor and the cold energy storage component to the air conditioning terminal, the electronic control valves K1, K2, and K3, the main water pump J2, and the chilled water pump J1 are all in the on state, and each water pump is controlled by its matched frequency converter so that the flow of the main water pump is greater than that of the chilled water pump, and referring to FIG. 6, the flowing of the water flow in the chilled water pipeline comprises at this time comprising: flowing for the compressor supplying cold to the terminal and flowing for the cold energy storage component supplying cold to the terminal, wherein the flowing for the compressor supplying cold to the terminal is: evaporator 594→K1→K2→air conditioning terminal 57→J2→J1→evaporator 594; and the flowing for the cold energy storage component supplying cold to the terminal is: cold-storage energy-storage component→K2→air conditioning terminal 57→J2→K3→cold-storage energy-storage component.

Embodiment 4

Based on the same concept, this embodiment provides an energy control device, for implementing the energy control method described in the above embodiment. The apparatus can be implemented by software and/or hardware, and the apparatus can be generally integrated in a terminal or a server.

Figure 8:
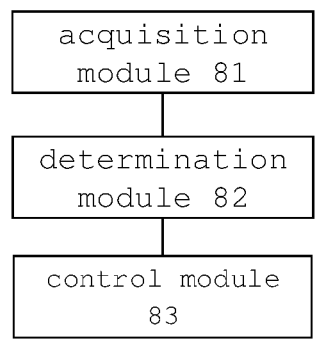
FIG. 8 is a structural block diagram of an energy control device according to Embodiment 4 of the present disclosure.

FIG. 8 is a structural block diagram of an energy control device according to Embodiment 4 of the present disclosure, and as shown in FIG. 8, the apparatus comprises:
an acquisition module 81 configured to acquire weather forecast information of an area where a controlled system is located in a preset future time period;
a determination module 82 configured to determine an optimal energy flowing configuration of the controlled system in the preset future time period according to the weather forecast information and current energy storage information of the controlled system; and a control module 83 configured to control the controlled system to run according to the optimal energy flowing configuration so that the controlled system is in an optimal running state with maximum benefit in the preset future time period.

In some embodiments, the determination module 82 comprises:

a first estimation unit configured to estimate electricity energy generated by a power generation equipment at each time moment in the preset future time period according to the weather forecast information;

a second estimation unit configured to estimate cold energy required by an air conditioning equipment at each time moment in the preset future time period according to a preset rule; and an operation unit configured to perform evolutionary operation on an objective function to obtain the optimal energy flowing configuration according to the generated electricity energy at each time moment, the required cold energy at each time moment, the current energy storage information, and an energy balance formula of the controlled system.

In some embodiments, the objective function is:

$$\min_{0-\tau} y(t) = \min_{0-\tau} f(f_1(t), f_2(t)),$$

$$\text{wherein} \begin{cases} f_1(t) = \int_0^\tau m(t)p(t)dt \\ f_2(t) = c(t) - h_M(t) \end{cases},$$

$\tau$ denotes a duration of the preset future time period, t denotes a time moment in the preset future time period, $f_1(t)$ denotes an electricity charge budget of the controlled system, $m(t)$ denotes an electricity price of an alternating-current power grid, $p(t)$ denotes electricity consumption power of the controlled system to the alternating-current power grid, $f_2(t)$ denotes a difference between required cold energy of the controlled system and actual supply cold energy, $c(t)$ denotes refrigeration power required by an air conditioning terminal in the controlled system, $h_M(t)$ denotes actual refrigeration power of the air conditioning terminal in the controlled system.

In some embodiments, the energy balance formula is:

$$\begin{cases} 0 = c(t) - c_S(t) - c_M(t) \\ 0 = p(t) - p_M(t) + p_P(t) - p_{SP}(t) \\ 0 = c_M(t) - \eta p_M(t) \\ 0 = p_P(t) - h_P(t)T(t) \\ 0 = p_{A(n+1)}(t) - \int_0^\tau p_{SP}(t)dt - p_{A(n)}(t) \\ 0 = c_{A(n+1)}(t) - \int_0^\tau c_S(t)dt - c_{A(n)}(t) \end{cases},$$

wherein $\tau$ denotes a duration of the preset future time period, t denotes a time moment in the preset future time period, $c(t)$ denotes refrigeration power required by an air conditioning terminal in the controlled system, $c_S(t)$ denotes cold energy storage power, $c_M(t)$ denotes refrigeration power of heat exchange of a compressor, $p(t)$ denotes electricity consumption power of the controlled system to the alternating-current power grid, $p_M(t)$ denotes electricity consumption power of energy-consumption heat exchange of the compressor, $p_P(t)$ denotes actual electricity generation power, $p_{SP}(t)$ denotes electricity storage power, $\eta$ denotes heat exchange efficiency of the compressor, $h_P(t)$ denotes an efficiency function of electricity generation power corresponding to a weather condition, $T(t)$ denotes a weather function, $p_{A(n)}(t)$ denotes current actual stored electricity energy of an energy storage equipment at an initial time moment of the operation, $p_{A(n+1)}(t)$ denotes real-time stored electricity energy in the preset future time period that is obtained by the operation, $c_{A(n)}(t)$ denotes current actual stored cold energy of the energy storage equipment at the initial time moment of the operation, and $c_{A(n+1)}(t)$ denotes real-time stored cold energy in the future preset time that is obtained by the operation.

In some embodiments, a limiting condition of the energy balance formula is:

$$\begin{cases} C_T \geq c(t) \\ C_S \geq c_S(t) \\ C_M \geq c_M(t) \\ P_T \geq p(t) \\ P_M \geq p_M(t) \\ p_M(t) \geq 0 \\ p_S(t) \geq 0 \\ P_{SP} \geq |p_{SP}(t)| \\ C \geq c_{An}(t) \\ P \geq p_{An}(t) \\ p_{An}(t) \geq 0 \\ c_{An}(t) \geq 0 \end{cases},$$

wherein $C_T$ denotes a maximum power limit of the refrigeration power required by the air conditioning terminal in the controlled system, $C_S$ denotes a maximum power limit of the cold energy storage power, $C_M$ denotes a maximum power limit of the refrigeration power of the heat exchange the compressor, $P_T$ denotes a maximum power limit of the electricity consumption power of the controlled system to the alternating-current power grid, $P_M$ denotes a maximum power limit of the electricity consumption power of the energy-consumption heat exchange of the compressor, $p_S(t)$ denotes estimated electricity generation power, $P_{SP}$ denotes a maximum power limit of the electricity storage power, C denotes maximum stored cold energy, and P denotes maximum stored electricity energy.

In some embodiments, the optimal energy flowing configuration comprises: in the preset future time period, the electricity consumption power of the controlled system to the alternating-current power grid at each time moment, the electricity consumption power of the energy-consumption heat exchange of the compressor at each time moment, the estimated electricity generation power at each time moment, the refrigeration power required by the air conditioning terminal at each time moment, the refrigeration power of the heat exchange of the compressor at each time moment, energy storage power at each time moment, and stored energy at each time moment, wherein the energy storage power at each time moment comprises: the electricity storage power at each time moment and/or the cold energy storage power at each time moment, the stored energy at each time moment comprises the stored electricity energy at each time moment and/or the stored cold energy at each time moment.

In some embodiments, the control module 83 comprises at least one of:

a first control unit configured to control, through a converter in the air conditioning equipment, energy flowing between the alternating-current power grid and a direct-current bus according to the electricity consumption power of the controlled system to the alternating-current power grid in the optimal energy flowing configuration;

a second control unit configured to control, through the converter in the air conditioning equipment, energy flowing between the compressor and the direct-current bus according to the electricity consumption power of the energy-consumption heat exchange of the compressor in the optimal energy flowing configuration;

a third control unit configured to control energy flowing between the power generation equipment and the direct-current bus according to the estimated electricity generation power in the optimal energy flowing configuration;

a fourth control unit configured to control, through a DC/DC transformer in the energy storage equipment, energy flowing between an electricity energy storage component in the energy storage equipment and the direct-current bus according to the electricity storage power in the optimal energy flowing configuration;

a fifth control unit configured to control, through the converter in the air conditioning equipment, energy flowing among a cold energy storage component in the energy storage equipment, an evaporator in an air conditioning host, and the air conditioning terminal, according to the cold energy storage power, the refrigeration power required by the air conditioning terminal, and the refrigeration power of the heat exchange of the compressor in the optimal energy flowing configuration; or a sixth control unit configured to control heat exchange between the air conditioning terminal and an area environment where the air conditioning terminal is located according to the refrigeration power required by the air conditioning terminal in the optimal energy flowing configuration.

In some embodiments, the first control unit is specifically configured to:

if the electricity consumption power of the controlled system to the alternating-current power grid is greater than 0, controlling a DC/AC module in the converter to start a controllable rectification mode, rectify alternating-current of the alternating-current power grid into direct-current, and control electric energy to flow from the alternating-current power grid to the direct-current bus;

if the electricity consumption power of the controlled system to the alternating-current power grid is less than 0, controlling the DC/AC module in the converter to start a controllable rectification mode, to invert direct-current of the direct-current bus into alternating-current and feed the alternating-current back to the alternating-current power grid; and if the electricity consumption power of the controlled system to the alternating-current power grid is equal to 0, controlling the DC/AC module in the converter to start a direct-current voltage stabilization mode, to stabilize voltage of the direct-current bus to MPPT voltage of the power generation equipment.

In some embodiments, the second control unit is specifically configured to:

if the electricity consumption power of the energy-consumption heat exchange of the compressor is greater than 0, controlling an AC/DC module in the converter to invert direct-current of the direct-current bus into alternating-current, and controlling electric energy to flow from the direct-current bus to the compressor; and if the electricity consumption power of the energy-consumption heat exchange of the compressor is equal to 0, controlling the AC/DC module in the converter to stop the inversion function, and controlling the compressor to stand by.

In some embodiments, the third control unit is specifically configured to:

if the estimated electricity generation power is greater than 0, controlling the power generation equipment to be in a power generation mode, and controlling electric energy to flow from the power generation equipment to the direct-current bus; and if the estimated electricity generation power is equal to 0, controlling the power generation equipment to stop generating electricity and to be in an open-circuit state.

In some embodiments, the fourth control unit is specifically configured to:

if the electricity storage power is greater than 0, converting electric energy of the direct-current bus, through the DC/DC transformer in the energy storage equipment, to charge the electricity energy storage component;

if the electricity storage power is equal to 0, controlling the DC/DC transformer to be in a standby state, and controlling the electricity energy storage component to be in a standby energy storage state; and if the electricity storage power is less than 0, converting electricity energy taken from the electricity energy storage component through the DC/DC transformer, to be supplied to the direct-current bus.

In some embodiments, the fifth control unit is specifically configured to:

if the cold energy storage power is greater than 0, controlling a first valve, a third valve and a chilled water pump to be opened through the converter to perform cold energy storage on the cold energy storage component, and controlling chilled water to flow in a cold energy storage state of the cold energy storage component according to the refrigeration power required by the air conditioning terminal;

if the cold energy storage power is equal to 0, controlling the third valve to be closed through the converter, and controlling the chilled water to flow in a standby state of the cold energy storage component according to the refrigeration power required by the air conditioning terminal; and if the cold energy storage power is less than 0, controlling the third valve to be opened through the converter to enable the cold energy storage component to release cold energy, and controlling cold energy supply of the air conditioning terminal according to the refrigeration power of the heat exchange of the compressor, wherein the evaporator in the air conditioner host is connected to the air conditioning terminal through a chilled water inlet pipe and a chilled water outlet pipe, the chilled water inlet pipe is thereon sequentially provided with a chilled water pump and a main water pump, the chilled water outlet pipe is thereon sequentially provided with the first valve and a second valve, the chilled water pump and the first valve are close to the evaporator side; and the cold energy storage component is connected between the first valve and the second valve through a first pipeline, and the cold energy storage component is also connected between the chilled water pump and the main water pump through a second pipeline, the second pipeline is thereon provided with the third valve.

In some embodiments, the fifth control unit performs the step of controlling chilled water to flow in a cold energy storage state of the cold energy storage component according to the refrigeration power required by the air conditioning terminal, specifically comprising:
- if the refrigeration power required by the air conditioning terminal is equal to 0, outputting a first control signal through the converter, wherein the first control signal is used for controlling the second valve and the main water pump to be closed; and
- if the refrigeration power required by the air conditioning terminal is greater than 0, outputting a second control signal through the converter, wherein the second control signal is used for controlling the second valve and the main water pump to be opened, and controlling a flow of the main water pump to be less than a flow of the chilled water pump.

In some embodiments, the fifth control unit performs the step of controlling the chilled water to flow in a standby state of the cold energy storage component according to the refrigeration power required by the air conditioning terminal, specifically comprising:
- if the refrigeration power required by the air conditioning terminal is equal to 0, outputting a third control signal through the converter, wherein the third control signal is used for controlling the first valve, the second valve, the chilled water pump, and the main water pump to be all closed; and
- if the refrigeration power required by the air conditioning terminal is greater than 0, outputting a fourth control signal through the converter, wherein the fourth control signal is used for controlling the first valve, the second valve, the chilled water pump, and the main water pump to be all opened, and controlling the flow of the main water pump to be equal to the flow of the chilled water pump.

In some embodiments, the fifth control unit performs the step of controlling cold energy supply of the air conditioning terminal according to the refrigeration power of the heat exchange of the compressor, specifically comprising:
- if the refrigeration power of the heat exchange of the compressor is equal to 0, determining that required cold energy is supplied by the cold energy storage component to the air conditioning terminal, and outputting a fifth control signal through the converter, wherein the fifth control signal is used for controlling the first valve and the chilled water pump to be closed, and controlling the second valve and the main water pump to be opened; and
- if the refrigeration power of the heat exchange of the compressor is greater than 0, determining that the required cold energy is jointly supplied by the compressor and the cold energy storage component to the air conditioning terminal, and outputting a sixth control signal through the converter, wherein the sixth control signal is used for controlling the first valve, the second valve, the chilled water pump, and the main water pump to be all opened, and controlling the flow of the main water pump to be greater than the flow of the chilled water pump.

The above apparatus can execute the method provided in the embodiment of the present disclosure, and has corresponding functional modules for executing the method and beneficial effects. For technical details that are not detailed in this embodiment, reference can be made to the method provided in the embodiment of the present disclosure.

Embodiment 5

This embodiment provides a computer-readable storage medium having thereon stored a computer program which, when executed by a processor, implements the energy control method according to the above embodiment.

Embodiment 6

This embodiment provides an electronic equipment, comprising: at least one processor; and a memory in communication connection with the at least one processor, wherein the memory has thereon stored instructions that can be executed by the at least one processor, so that the at least one processor implements the energy control method according to the above embodiment.

The apparatus embodiment described above is merely illustrative, in which the unit described as a separate component may or may not be physically separated, and a component displayed as a unit may or may not be a physical unit, that is, it can be located in one position, or can be distributed on a plurality of network units. Some or all of the modules can be selected according to actual needs to achieve the purpose of the solution of this embodiment.

It should be noted that the steps illustrated in the flow diagrams of the drawings can be performed in a computer system such as a set of computer-executable instructions and that, although a logical order is illustrated in the flow diagram, in some cases, the steps illustrated or described can be performed in an order different from that here.

Through the above description of the embodiments, those skilled in the art will clearly understand that each embodiment can be implemented by means of software plus a necessary general hardware platform, and of course, can also be implemented by means of hardware. Based on such understanding, the above technical solutions in essence or a part contributing to the prior art can be embodied in a form of a software product, wherein the computer software product can be stored in a computer-readable storage medium, such as a ROM/RAM, magnetic disk, optical disk, etc., and comprises several instructions so that one computer device (which can be a personal computer, a server, or a network device, etc.) executes the method according to the various embodiments or some certain parts of the embodiments.

Finally, it should be noted that: the above embodiments are only used to illustrate the technical solution of the present disclosure, not to limit it; although the present disclosure has been described in detail with reference to the foregoing embodiments, it should be understood by one of ordinary skill in the art that: the technical solutions described in the foregoing embodiments can still be modified, or some technical features thereof can be equivalently replaced; and these modifications and replacements do not make the essence of the corresponding technical solution depart from the spirit and scope of the technical solutions of the embodiments of the present disclosure.

What is claimed is:

1. An energy control method, wherein the method is applied to an energy control system,
the energy control system comprises: a controlled system, an energy control device, and a weather server; wherein: the controlled system comprises: a power generation equipment, an energy storage equipment, and an air conditioning equipment; the power generation equipment, the energy storage equipment, and the air conditioning equipment are connected in parallel through a direct-current bus; the air conditioning equipment is also connected to an alternating-current power grid; the energy control device is in communication connection with the controlled system and the weather server respectively, the energy control device is configured to acquire weather forecast information in a preset future time period from the weather server and send an optimal energy flowing configuration in the preset future time period to the controlled system;

the energy control method comprises:

acquiring weather forecast information of an area where a controlled system is located in a preset future time period;

determining an optimal energy flowing configuration of the controlled system in the preset future time period, according to the weather forecast information and current energy storage information of the controlled system; and controlling the controlled system to run according to the optimal energy flowing configuration so that the controlled system is in an optimal running state with maximum benefit in the preset future time period, wherein the determining an optimal energy flowing configuration of the controlled system in the preset future time period, according to the weather forecast information and current energy storage information of the controlled system comprises:

estimating electricity energy generated by a power generation equipment at each time moment in the preset future time period according to the weather forecast information;

estimating cold energy required by an air conditioning equipment at each time moment in the preset future time period according to a preset rule; and performing evolutionary operation on an objective function to obtain the optimal energy flowing configuration according to the generated electricity energy at each time moment, the required cold energy at each time moment, the current energy storage information, and an energy balance formula of the controlled system.

2. The energy control method according to claim 1, wherein the air conditioning equipment comprises: a converter and an air conditioning host; wherein:

the converter comprises: a first alternating-current end, a second alternating-current end, and a direct-current end;

the first alternating-current end is connected to the alternating-current power grid, the second alternating-current end is connected to the air conditioning host, the direct-current end is connected to the direct-current bus.

3. The energy control method according to claim 2, wherein the converter comprises: an AC/DC module and a DC/AC module, wherein:

the AC/DC module comprises a first end and a second end, the DC/AC module comprises a third end and a fourth end;

the first end is used as the second alternating-current end of the converter;

the second end is connected to the third end, and a connection point of the second end and the third end is used as the direct-current end of the converter;

the fourth end is used as the first alternating-current end of the converter.

4. The energy control method according to claim 2, wherein the converter is in communication connection with the energy control device.

5. The energy control method according to claim 2, wherein the air conditioning host comprises: a compressor, a condenser, a throttling device, and an evaporator, wherein the compressor is connected to the second alternating-current end of the converter.

6. The energy control method according to claim 1, wherein the energy storage equipment comprises: an energy storage mechanism and a DC/DC transformer; wherein:

one end of the DC/DC transformer is connected to the energy storage mechanism, and the other end of the DC/DC transformer is connected to the direct-current bus; the energy storage mechanism is also connected to the air conditioning equipment.

7. The energy control method according to claim 6, wherein the energy storage mechanism comprises: an electricity energy storage component and a cold energy storage component; or, the electricity energy storage component or the cold energy storage component; wherein:

in a case that the energy storage mechanism comprises the electricity energy storage component, the electricity energy storage component is connected to the DC/DC transformer;

the evaporator in the air conditioning host is connected to an air conditioning terminal through a chilled water inlet pipeline and a chilled water outlet pipeline, the chilled water inlet pipeline is thereon sequentially provided with a chilled water pump and a main water pump, the chilled water outlet pipeline is thereon sequentially provided with a first valve and a second valve, the chilled water pump and the first valve are close to the evaporator side;

in a case that the energy storage mechanism comprises the cold energy storage component, the cold energy storage component is connected between the first valve and the second valve through a first pipeline, the cold energy storage component is also connected between the chilled water pump and the main water pump through a second pipeline, the second pipeline is thereon provided with a third valve;

or, the DC/DC transformer is in communication connection with the energy control device.

8. The energy control method according to claim 1, wherein:

the energy control system further comprises: a communication module, connected between the energy control device and the weather server;

or, the power generation equipment is a photovoltaic power generation equipment.

9. The method according to claim 1, wherein the objective function is:

$$\min_{0-\tau} y(t) = \min_{0-\tau} f(f_1(t), f_2(t)),$$

$$\text{wherein } \begin{cases} f_1(t) = \int_0^\tau m(t)p(t)d(t) \\ f_2(t) = c(t) - h_M(t) \end{cases},$$

$\tau$ denotes a duration of the preset future time period, t denotes a time moment in the preset future time period, $f_1(t)$ denotes an electricity charge budget of the controlled system, m(t) denotes an electricity price of an alternating-current power grid, p(t) denotes electricity consumption power of the controlled system to the alternating-current power grid, $f_2(t)$ denotes a difference between required cold energy of the controlled system and actual supply cold energy, c(t) denotes refrigeration power required by an air conditioning terminal in the controlled system, $h_M(t)$ denotes actual refrigeration power of the air conditioning terminal in the controlled system.

10. The method according to claim 1, wherein the energy balance formula is:

$$\begin{cases} 0 = c(t) - c_S(t) - c_M(t) \\ 0 = p(t) - p_M(t) + p_P(t) - p_{SP}(t) \\ 0 = c_M(t) - \eta p_M(t) \\ 0 = p_P(t) - h_P(t)T(t) \\ 0 = p_{A(n+1)}(t) - \int_0^\tau p_{SP}(t)d(t) - p_{A(n)}(t) \\ 0 = c_{A(n+1)}(t) - \int_0^\tau c_S(t)d(t) - c_{A(n)}(t) \end{cases},$$

wherein τ denotes a duration of the preset future time period, t denotes a time moment in the preset future time period, c(t) denotes refrigeration power required by an air conditioning terminal in the controlled system, $c_S(t)$ denotes cold energy storage power, $c_M(t)$ denotes refrigeration power of heat exchange of a compressor, (t) denotes electricity consumption power of the controlled system to the alternating-current power grid, $p_M(t)$ denotes electricity consumption power of energy-consumption heat exchange of the compressor, $p_P(t)$ denotes actual electricity generation power, $p_{SP}(t)$ denotes electricity storage power, η denotes heat exchange efficiency of the compressor, $h_P(t)$ denotes an efficiency function of electricity generation power corresponding to a weather condition, T(t) denotes a weather function, $p_{A(n)}(t)$ denotes current actual stored electricity energy of an energy storage equipment at an initial time moment of the operation, $p_{A(n+1)}(t)$ denotes real-time stored electricity energy in the preset future time period that is obtained by the operation, $c_{A(n)}(t)$ denotes current actual stored cold energy of the energy storage equipment at the initial time moment of the operation, and $c_{A(n+1)}(t)$ denotes real-time stored cold energy in the future preset time that is obtained by the operation.

11. The method according to claim 10, wherein a limiting condition of the energy balance formula is:

$$\begin{cases} C_T \geq c(t) \\ C_S \geq c_S(t) \\ C_M \geq c_M(t) \\ P_T \geq p(t) \\ P_M \geq p_M(t) \\ p_M(t) \geq 0 \\ p_S(t) \geq 0 \\ P_{SP} \geq |p_{SP}(t)| \\ C \geq c_{An}(t) \\ P \geq p_{An}(t) \\ p_{An}(t) \geq 0 \\ c_{An}(t) \geq 0 \end{cases},$$

wherein $C_T$ denotes a maximum power limit of the refrigeration power required by the air conditioning terminal in the controlled system, $C_S$ denotes a maximum power limit of the cold energy storage power, $C_M$ denotes a maximum power limit of the refrigeration power of the heat exchange the compressor, $P_T$ denotes a maximum power limit of the electricity consumption power of the controlled system to the alternating-current power grid, $P_M$ denotes a maximum power limit of the electricity consumption power of the energy-consumption heat exchange of the compressor, $p_S(t)$ denotes estimated electricity generation power, $P_{SP}$ denotes a maximum power limit of the electricity storage power, C denotes maximum stored cold energy, and P denotes maximum stored electricity energy.

12. The method according to claim 1, wherein the optimal energy flowing configuration comprises: in the preset future time period, the electricity consumption power of the controlled system to the alternating-current power grid at each time moment, the electricity consumption power of the energy-consumption heat exchange of the compressor at each time moment, the estimated electricity generation power at each time moment, the refrigeration power required by the air conditioning terminal at each time moment, the refrigeration power of the heat exchange of the compressor at each time moment, energy storage power at each time moment, and stored energy at each time moment, wherein the energy storage power at each time moment comprises: the electricity storage power at each time moment and/or the cold energy storage power at each time moment, the stored energy at each time moment comprises the stored electricity energy at each time moment and/or the stored cold energy at each time moment.

13. The method according to claim 12, wherein the controlling the controlled system to run according to the optimal energy flowing configuration comprises at least one of:

controlling, through a converter in the air conditioning equipment, energy flowing between the alternating-current power grid and a direct-current bus according to the electricity consumption power of the controlled system to the alternating-current power grid in the optimal energy flowing configuration;

controlling, through the converter in the air conditioning equipment, energy flowing between the compressor and the direct-current bus according to the electricity consumption power of the energy-consumption heat exchange of the compressor in the optimal energy flowing configuration;

controlling energy flowing between the power generation equipment and the direct-current bus according to the estimated electricity generation power in the optimal energy flowing configuration;

controlling, through a DC/DC transformer in the energy storage equipment, energy flowing between an electricity energy storage component in the energy storage equipment and the direct-current bus according to the electricity storage power in the optimal energy flowing configuration;

controlling, through the converter in the air conditioning equipment, energy flowing among a cold energy storage component in the energy storage equipment, an evaporator in an air conditioning host, and the air conditioning terminal, according to the cold energy storage power, the refrigeration power required by the air conditioning terminal, and the refrigeration power of the heat exchange of the compressor in the optimal energy flowing configuration; or controlling heat exchange between the air conditioning terminal and an area environment where the air conditioning terminal is located according to the refrigeration power required by the air conditioning terminal in the optimal energy flowing configuration.

14. The method according to claim 13, wherein the controlling, through a converter in the air conditioning equipment, energy flowing between the alternating-current power grid and a direct-current bus according to the electricity consumption power of the controlled system to the alternating-current power grid in the optimal energy flowing configuration comprises:

if the electricity consumption power of the controlled system to the alternating-current power grid is greater than 0, controlling a DC/AC module in the converter to start a controllable rectification mode, rectify alternating-current of the alternating-current power grid into direct-current, and control electric energy to flow from the alternating-current power grid to the direct-current bus;

if the electricity consumption power of the controlled system to the alternating-current power grid is less than 0, controlling the DC/AC module in the converter to start a controllable rectification mode, to invert direct-current of the direct-current bus into alternating-current and feed the alternating-current back to the alternating-current power grid; and if the electricity consumption power of the controlled system to the alternating-current power grid is equal to 0, controlling the DC/AC module in the converter to start a direct-current voltage stabilization mode, to stabilize voltage of the direct-current bus to MPPT voltage of the power generation equipment;

or, the controlling, through the converter in the air conditioning equipment, energy flowing between the compressor and the direct-current bus according to the electricity consumption power of the energy-consumption heat exchange of the compressor in the optimal energy flowing configuration comprises:

if the electricity consumption power of the energy-consumption heat exchange of the compressor is greater than 0, controlling an AC/DC module in the converter to invert direct-current of the direct-current bus into alternating-current, and controlling electric energy to flow from the direct-current bus to the compressor; and if the electricity consumption power of the energy-consumption heat exchange of the compressor is equal to 0, controlling the AC/DC module in the converter to stop the inversion function, and controlling the compressor to stand by;

or, the controlling energy flowing between the power generation equipment and the direct-current bus according to the estimated electricity generation power in the optimal energy flowing configuration comprises:

if the estimated electricity generation power is greater than 0, controlling the power generation equipment to be in a power generation mode, and controlling electric energy to flow from the power generation equipment to the direct-current bus; and if the estimated electricity generation power is equal to 0, controlling the power generation equipment to stop generating electricity and to be in an open-circuit state;

or, the controlling, through a DC/DC transformer in the energy storage equipment, energy flowing between an electricity energy storage component in the energy storage equipment and the direct-current bus according to the electricity storage power in the optimal energy flowing configuration comprises:

if the electricity storage power is greater than 0, converting electric energy of the direct-current bus, through the DC/DC transformer in the energy storage equipment, to charge the electricity energy storage component;

if the electricity storage power is equal to 0, controlling the DC/DC transformer to be in a standby state, and controlling the electricity energy storage component to be in a standby energy storage state; and if the electricity storage power is less than 0, converting electricity energy taken from the electricity energy storage component through the DC/DC transformer, to be supplied to the direct-current bus;

or, the controlling, through the converter in the air conditioning equipment, energy flowing among a cold energy storage component in the energy storage equipment, an evaporator in an air conditioning host, and the air conditioning terminal, according to the cold energy storage power, the refrigeration power required by the air conditioning terminal, and the refrigeration power of the heat exchange of the compressor in the optimal energy flowing configuration comprises:

if the cold energy storage power is greater than 0, controlling a first valve, a third valve and a chilled water pump to be opened through the converter to perform cold energy storage on the cold energy storage component, and controlling chilled water to flow in a cold energy storage state of the cold energy storage component according to the refrigeration power required by the air conditioning terminal; if the cold energy storage power is equal to 0, controlling the third valve to be closed through the converter, and controlling the chilled water to flow in a standby state of the cold energy storage component according to the refrigeration power required by the air conditioning terminal; and if the cold energy storage power is less than 0, controlling the third valve to be opened through the converter to enable the cold energy storage component to release cold energy, and controlling cold energy supply of the air conditioning terminal according to the refrigeration power of the heat exchange of the compressor, wherein the evaporator in the air conditioner host is connected to the air conditioning terminal through a chilled water inlet pipe and a chilled water outlet pipe, the chilled water inlet pipe is thereon sequentially provided with a chilled water pump and a main water pump, the chilled water outlet pipe is thereon sequentially provided with the first valve and a second valve, the chilled water pump and the first valve are close to the evaporator side; and the cold energy storage component is connected between the first valve and the second valve through a first pipeline, and the cold energy storage component is also connected between the chilled water pump and the main water pump through a second pipeline, the second pipeline is thereon provided with the third valve.

15. The method according to claim 14, wherein the controlling chilled water to flow in a cold energy storage state of the cold energy storage component according to the refrigeration power required by the air conditioning terminal comprises:

if the refrigeration power required by the air conditioning terminal is equal to 0, outputting a first control signal through the converter, wherein the first control signal is used for controlling the second valve and the main water pump to be closed; and if the refrigeration power required by the air conditioning terminal is greater than 0, outputting a second control signal through the converter, wherein the second control signal is used for controlling the second valve and the main water pump to be opened, and controlling a flow of the main water pump to be less than a flow of the chilled water pump;

or, the controlling the chilled water to flow in a standby state of the cold energy storage component according to the refrigeration power required by the air conditioning terminal comprises:

if the refrigeration power required by the air conditioning terminal is equal to 0, outputting a third control signal through the converter, wherein the third control signal is used for controlling the first valve, the second valve, the chilled water pump, and the main water pump to be all closed; and if the refrigeration power required by the air conditioning terminal is greater than 0, outputting a fourth control signal through the converter, wherein the fourth control signal is used for controlling the first valve, the second valve, the chilled water pump, and the main water pump to be all opened, and controlling the flow of the main water pump to be equal to the flow of the chilled water pump;

or, the controlling cold energy supply of the air conditioning terminal according to the refrigeration power of the heat exchange of the compressor comprises:

if the refrigeration power of the heat exchange of the compressor is equal to 0, determining that required cold energy is supplied by the cold energy storage component to the air conditioning terminal, and outputting a fifth control signal through the converter, wherein the fifth control signal is used for controlling the first valve and the chilled water pump to be closed, and controlling the second valve and the main water pump to be opened; and if the refrigeration power of the heat exchange of the compressor is greater than 0, determining that the required cold energy is jointly supplied by the compressor and the cold energy storage component to the air conditioning terminal, and outputting a sixth control signal through the converter, wherein the sixth control signal is used for controlling the first valve, the second valve, the chilled water pump, and the main water pump to be all opened, and controlling the flow of the main water pump to be greater than the flow of the chilled water pump.

16. A computer-readable storage medium stored a computer program, wherein the program, when executed by a processor, implements the energy control method according to claim 1.

17. An electronic equipment, comprising: at least one processor; and a memory in communication connection with the at least one processor, wherein the memory stores instructions that are executed by the at least one processor, the instructions are executed by the at least one processor so that the at least one processor implements the energy control method according to claim 1.

18. An energy control device, which is applied to an energy control system, the energy control system comprises: a controlled system, an energy control device, and a weather server; wherein: the controlled system comprises; a power generation equipment, an energy storage equipment, and an air conditioning equipment; the power generation equipment the energy storage equipment, and the air conditioning equipment are connected in parallel through a direct-current bus; the air conditioning equipment is also connected to an alternating-current power grid; the energy control device is in communication connection with the controlled system and the weather server respectively, the energy control device is configured to acquire weather forecast information in a preset future time period from the weather server and send an optimal energy flowing configuration in the preset future time period to the controlled system;

the energy control device comprises:

an acquisition module configured to acquire weather forecast information of an area where a controlled system is located in a preset future time period;

a determination module configured to determine an optimal energy flowing configuration of the controlled system in the preset future time period according to the weather forecast information and current energy storage information of the controlled system, comprising:

estimating electricity energy generated by a power generation equipment at each time moment in the preset future time period according to the weather forecast information;

estimating cold energy required by an air conditioning equipment at each time moment in the preset future time period according to a preset rule; and performing evolutionary operation on an objective function to obtain the optimal energy flowing configuration according to the generated electricity energy at each time moment, the required cold energy at each time moment, the current energy storage information, and an energy balance formula of the controlled system; and a control module configured to control the controlled system to run according to the optimal energy flowing configuration, so that the controlled system is in an optimal running state with maximum benefit in the preset future time period.

* * * * *